(12) United States Patent
Hyslop

(10) Patent No.: US 6,598,896 B1
(45) Date of Patent: Jul. 29, 2003

(54) TRAILER-MOUNTED LATCHING MECHANISM FOR A BOAT

(76) Inventor: William J. Hyslop, 105 Jefferson Valley, Coatesville, IN (US) 46121

( * ) Notice: Subject to any disclaimer, the term of this patent is extended or adjusted under 35 U.S.C. 154(b) by 0 days.

(21) Appl. No.: 10/158,320

(22) Filed: May 30, 2002

(51) Int. Cl.$^7$ .................................................. B60D 3/10
(52) U.S. Cl. ........................ 280/414.1; 292/11; 292/18; 292/24; 292/30; 292/45
(58) Field of Search ........................ 280/414.1, 414.3, 280/508, 515; 292/11, 24, 27, 28, 30, 53, 45, 18, 50

(56) References Cited

U.S. PATENT DOCUMENTS

| | | | | |
|---|---|---|---|---|
| 621,574 A | * | 3/1899 | Kinsey | 292/24 |
| 988,114 A | * | 3/1911 | Belle | 292/27 |
| 2,061,083 A | * | 11/1936 | Niemi | 292/27 |
| 2,118,729 A | * | 5/1938 | Hogan | 292/27 |
| 2,491,373 A | * | 12/1949 | Goff | 280/508 |
| 2,506,943 A | * | 5/1950 | Shreve | 292/30 |
| 3,325,186 A | | 6/1967 | Lund | 280/477 |
| 3,933,330 A | * | 1/1976 | Gwin | 292/27 |
| 3,938,829 A | | 2/1976 | Anderson | 280/414 R |
| 3,963,263 A | | 6/1976 | Whitlock | 280/414 R |
| 3,989,267 A | | 11/1976 | Robinson | 280/414 R |
| 4,114,920 A | | 9/1978 | Boettcher | 280/414 R |
| 4,463,965 A | * | 8/1984 | Lawson | 280/414.1 |
| 4,919,446 A | | 4/1990 | Higgins | 280/414.1 |
| 5,120,079 A | | 6/1992 | Boggs | 280/414.1 |
| 5,209,530 A | * | 5/1993 | Kolloch | 292/27 |
| 5,567,095 A | | 10/1996 | James et al. | 410/7 |
| 5,599,035 A | | 2/1997 | Spence | 280/414.1 |
| 5,683,214 A | | 11/1997 | Jeffreys | 410/77 |
| 5,876,166 A | | 3/1999 | Hyslop | 410/77 |
| 5,915,766 A | * | 6/1999 | Baumeister | 292/27 |

* cited by examiner

*Primary Examiner*—Daniel G. DePumpo
(74) *Attorney, Agent, or Firm*—Woodard, Emhardt, Moriarty, McNett & Henry LLP

(57) ABSTRACT

A latching mechanism for receiving a boat bow U-bolt includes a frame member with a receiving channel for receipt of the U-bolt. A pair of spring-biased latching members are attached to the frame member and arranged in a normally-closed condition and therein narrow the width of the receiving channel at an entrance location. The latching members are pivotally moveable to an open condition by the action of the U-bolt pushing against the latching members until the U-bolt enters the receiving channel. A release slide is included as part of the latching mechanism to allow the U-bolt to be released. The release slide is spring biased for movement from a load-launch orientation to a stowed orientation. The latching mechanism is designed to attach to a winch stand and includes two separate mounting connections for this purpose.

36 Claims, 18 Drawing Sheets

TRAILER-MOUNTED LATCHING MECHANISM FOR A BOAT

BACKGROUND OF THE INVENTION

The present invention relates in general to latching mechanisms which are designed to securely connect or attach one object to another object, such as a boat to a boat trailer. More specifically the present invention relates to an automatic latching mechanism which is attached to a boat trailer and which receives and securely holds the U-bolt which is fixed to the bow of a boat.

Boat trailers for transporting, launching, and retrieving fishing boats and pleasure boats are widely used by the boating public. While a variety of different winch and tow rope arrangements have been and may be employed, one commonly used element of such arrangements is a U-bolt or eyelet of some configuration which is fixed to the bow of the boat, typically on the centerline of the boat. Since the bow U-bolt is typically located in a similar position, independent of the particular boat style, it provides one aspect of some consistency between varying designs, styles, sizes, and makes of boats.

A review of earlier patents indicates that one disadvantage, as viewed by other designers, with a winch and tow rope arrangement is that at least two people are required to effectively retrieve and load the boat onto the trailer. One person is normally needed to connect the tow line to the boat and operate the winch. The other person is required to navigate and maintain the boat in alignment with the boat trailer. Since there are situations where two people are not always available to load a boat onto a boat trailer, it has been suggested that it would be an improvement to existing trailer designs with a winch and tow rope arrangement if an automatic latching mechanism could be provided which securely attaches to the U-bolt of the boat bow. While an automatic latching mechanism on the boat trailer would conceivably only require one individual to load the boat onto the boat trailer, as a practical matter you would prefer to have one individual handling the boat and a second individual handling the boat trailer and the vehicle towing the boat trailer. This is the most efficient approach. However, even with two individuals and even if a winch and tow rope arrangement is available, there is still a certain awkwardness to the currently practiced method. While one individual stays with the trailer and tow vehicle, the individual directing the boat onto the trailer may be required to lean forward over the bow and hook the winch rope into the U-bolt. It would thus be an improvement to this procedure if an automatic latching mechanism could be provided.

Over the years certain designers have tried to provide improvements to the winch and tow rope arrangements, even suggesting elimination of those arrangements. One such earlier design effort involves the use of a latching mechanism with a locking pin. This type of design is represented by U.S. Pat. No. 3,989,267 which issued Nov. 2, 1976 to Robinson. In order to perform its intended function, the pin 27 of U.S. Pat. No. 3,989,267 must be initially pulled out, set in a cocked position, and biased by spring 33 against the edge of trigger plate 30. The associated spring compression and preload is a disadvantage in that this arrangement results in greater wear and a greater risk that the cocked arrangement will be jarred loose and released prior to connecting to the U-bolt. If the cocked arrangement is jarred loose and released, it would not be properly conditioned to receive and thereafter securely hold the U-bolt. Another concern with this design is the constant load on pin 27 when it is inserted through the U-bolt due to the weight of the boat.

While the '267 patent represents one trailer latch mechanism which does not involve a winch and tow rope arrangement, other similar design arrangements are represented by the following patents:

| U.S. Pat. No. | INVENTOR | DATE |
|---|---|---|
| 3,938,829 | Anderson | Feb. 17, 1976 |
| 4,114,920 | Boettcher | Sep. 19, 1978 |
| 4,919,446 | Higgins | Apr. 24, 1990 |

In evaluating the efficiency, reliability, cost and suitability of these other designs, it is important to keep in mind that reliability is of primary importance. The preferred latching mechanism is one which is normally unloaded and not in a highly spring-biased condition, one which operates in an automatic manner and is virtually fool-proof, one which is suitable for a wide range of boat shapes and sizes, and one which will securely anchor the boat to the trailer regardless of external conditions such as the angle of the trailer, size and weight of the boat, and the speed at which the boat ramps up onto the boat trailer. It is also preferred that the latching mechanism be designed such that it is extremely strong and any wear loading is minimal. Many of these desirable design features were incorporated into the earlier invention of Hyslop, now disclosed and claimed in U.S. Pat. No. 5,876,166 which issued Mar. 2, 1999. This earlier patent is expressly incorporated by reference herein for its entire disclosure.

Since the completion of the invention of the 5,876,166 patent and after working with the commercial embodiment of the claimed invention of the '166 patent, various improvements were conceived of by the sole inventor. These various improvements are described, illustrated and claimed herein. Included is an improved design in the bolt mounting arrangement, using separate bolts in lieu of one through-bolt. Significant changes have also been made in the shape of the jaws and the shape of the (release) slide member. One very important change was to the direction the jaws rotate when releasing the captured U-bolt. The jaws now rotate away from the U-bolt. The jaws rotated toward the captured U-bolt in the prior invention. The jaws could not be opened if the boat moved back on the trailer and the U-bolt applied pressure against the jaws. Some of the finer points of the mechanism operation have been improved for a more reliable device and one with added safety features. These improvements provide design versatility and contribute to the simplicity of use of the overall design. As such, these improvements are considered to be novel and unobvious.

SUMMARY OF THE INVENTION

A latching mechanism constructed and arranged to be attached to a boat trailer and to securely receive a boat bow connection member so as to facilitate keeping the boat on the boat trailer according to one embodiment of the present invention comprises a frame member defining a receiving channel for receipt of the connection member, the receiving channel including an entrance, a pair of spring-biased latching members which are pivotally attached to the frame member, the spring-biased latching members being constructed and arranged to be normally oriented in a closed condition wherein the spring-biased latching members cooperate to narrow the width of the receiving channel at a location adjacent the entrance, a release slide attached to the frame member and being moveable from a first position wherein the latching mechanism is in a load-launch orientation to a second position wherein the latching mechanism is in a stowed orientation, wherein in the load-launch orientation the spring-biased latching members are pivotally moveable to an open condition by the action of pushing the connection member into abutment against the spring-biased latching members until the connection members enters (or leaves) the receiving channel.

One object of the present invention is to provide an improved latching mechanism for securing a boat bow to a boat trailer.

Related objects and advantages of the present invention will be apparent from the following description.

DESCRIPTION OF THE PREFERRED EMBODIMENTS

Figure 1:
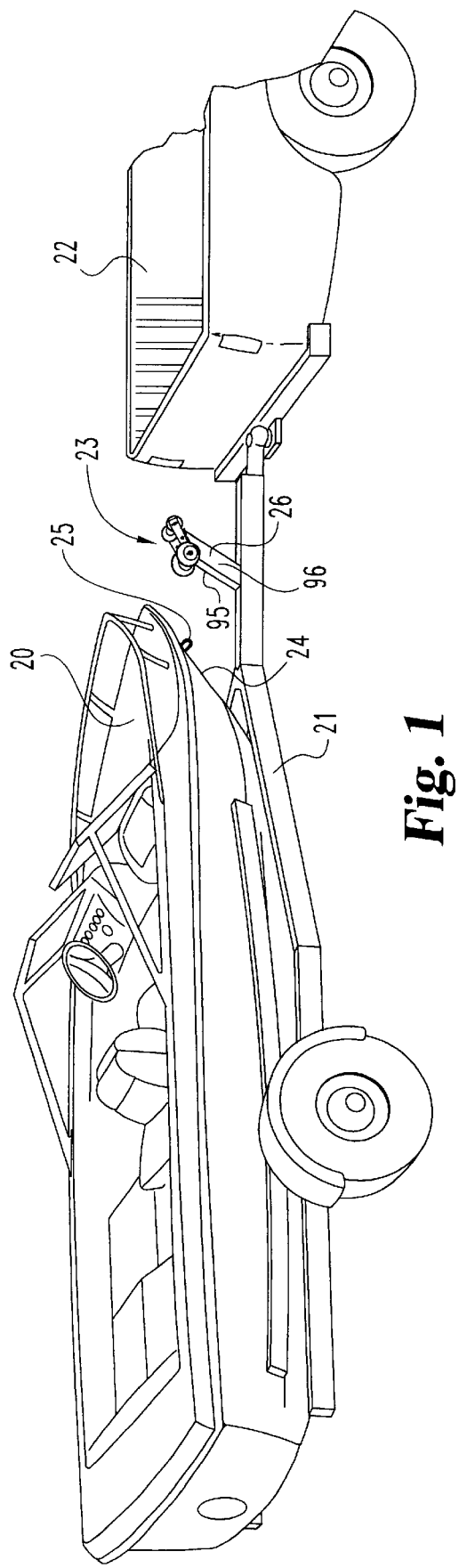
FIG. 1 is a side elevational view of a boat loaded onto a boat trailer which includes a prior art latching mechanism.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a boat 20 being loaded onto a boat trailer 21 which is in tow behind a vehicle 22. Attached to the trailer 21 is a first (earlier) embodiment of a latching mechanism 23 which is designed and attached to the trailer according to the prior art. The bow 24 of the boat 20 includes a U-bolt 25 which may alternatively take the form of an eyebolt. In order to attach the bolt to the trailer as the boat is coming out of the water and being loaded onto the trailer, the latching mechanism 23 is designed to automatically and securely receive the U-bolt 25. The clevis-type bracket arrangement 26 on the trailer is used to attach the latching mechanism by means of conventional mounting hardware. As the boat 20 moves up onto the trailer 21, the bow 24 is guided into and along the longitudinal centerline of latching mechanism 23. Eventually the U-bolt 25 slides into and pushes open the spring-biased closing jaws of the latching mechanism 23 which then automatically latch closed through the interior opening of the U-bolt.

Figure 2:
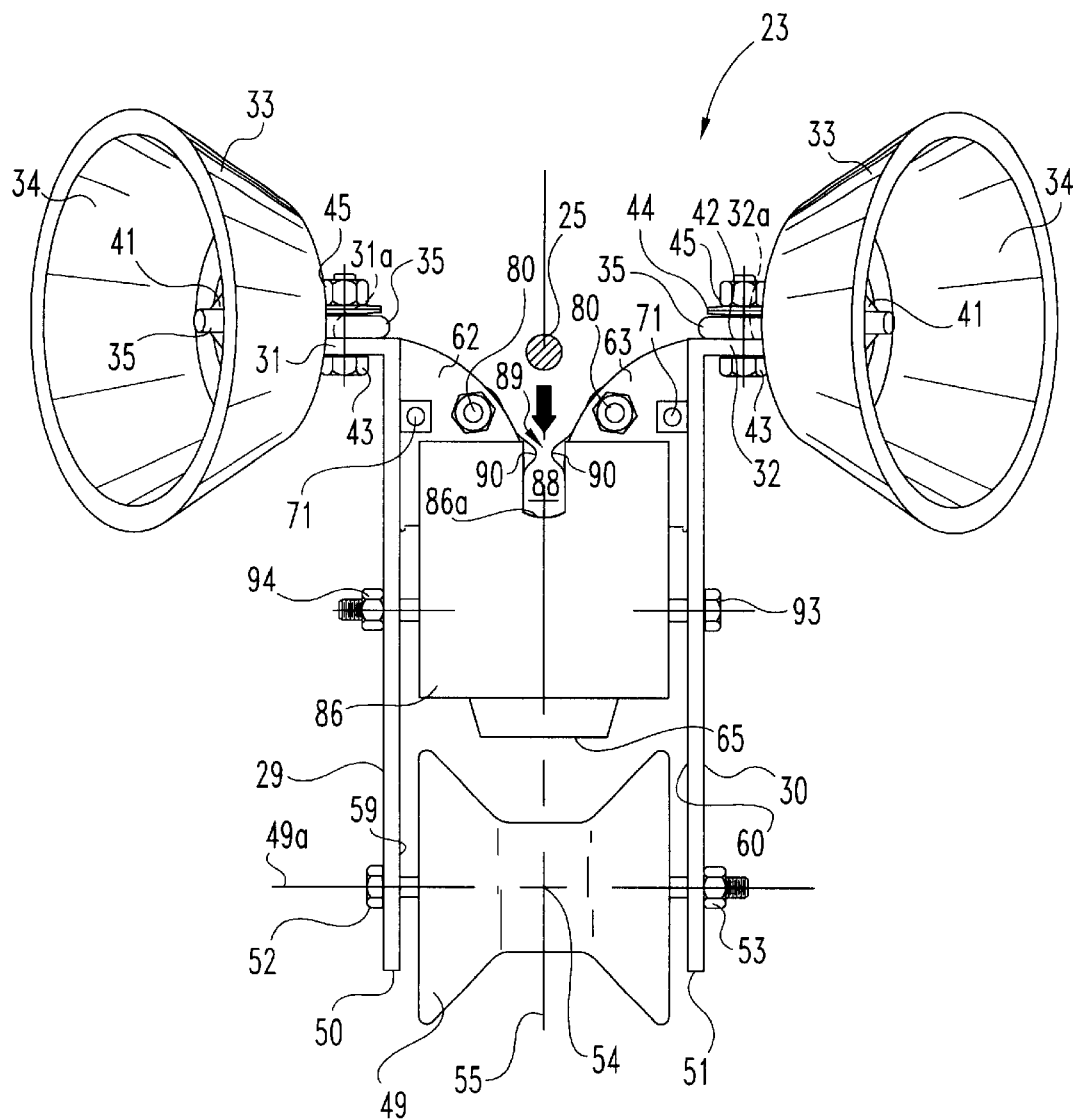
FIG. 2 is a top plan view of the FIG. 1 prior art latching mechanism in an unlatched condition.
Figure 3:
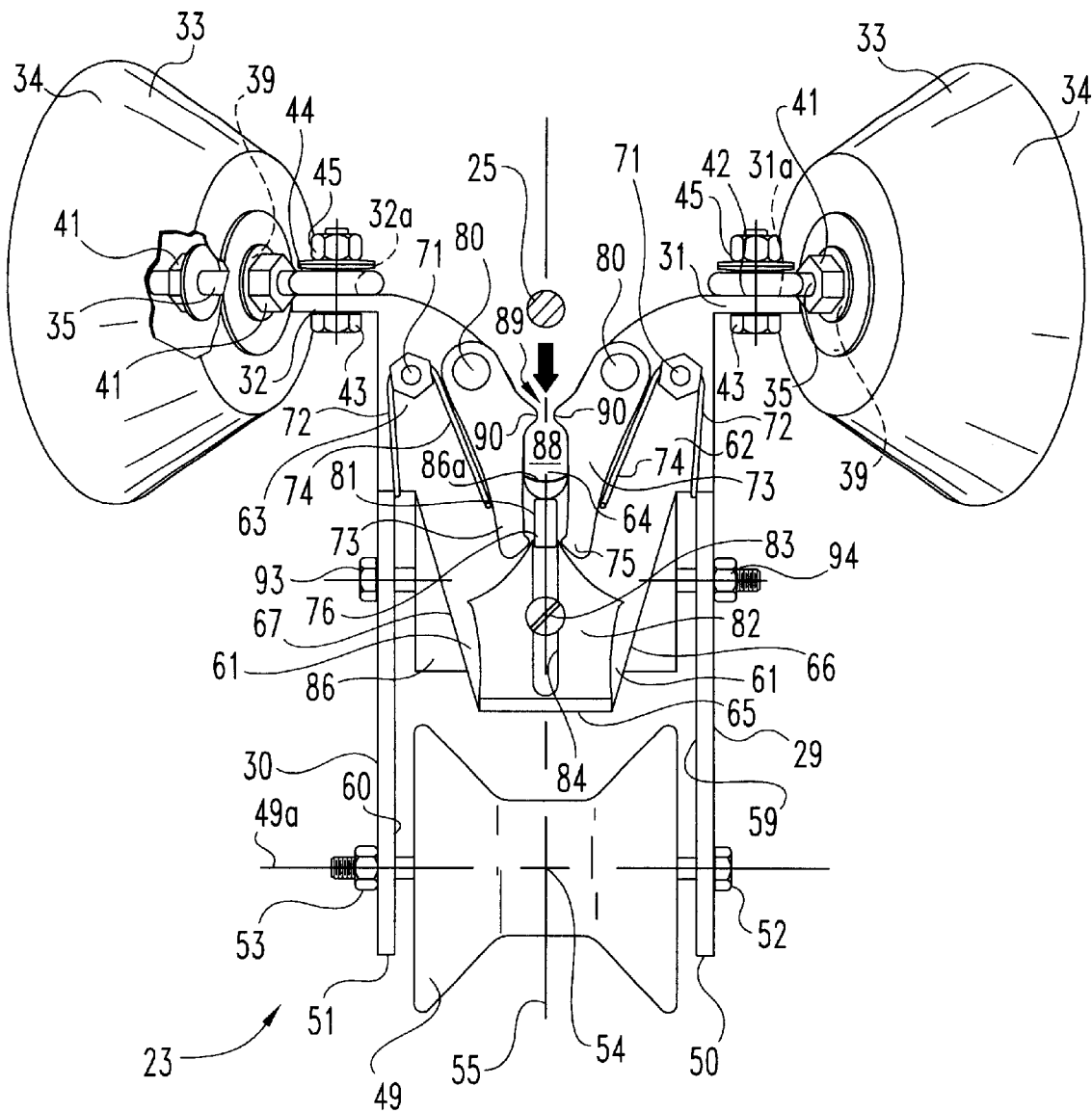
FIG. 3 is a bottom plan view of the FIG. 1 prior art latching mechanism in an unlatched condition.
Figure 4:
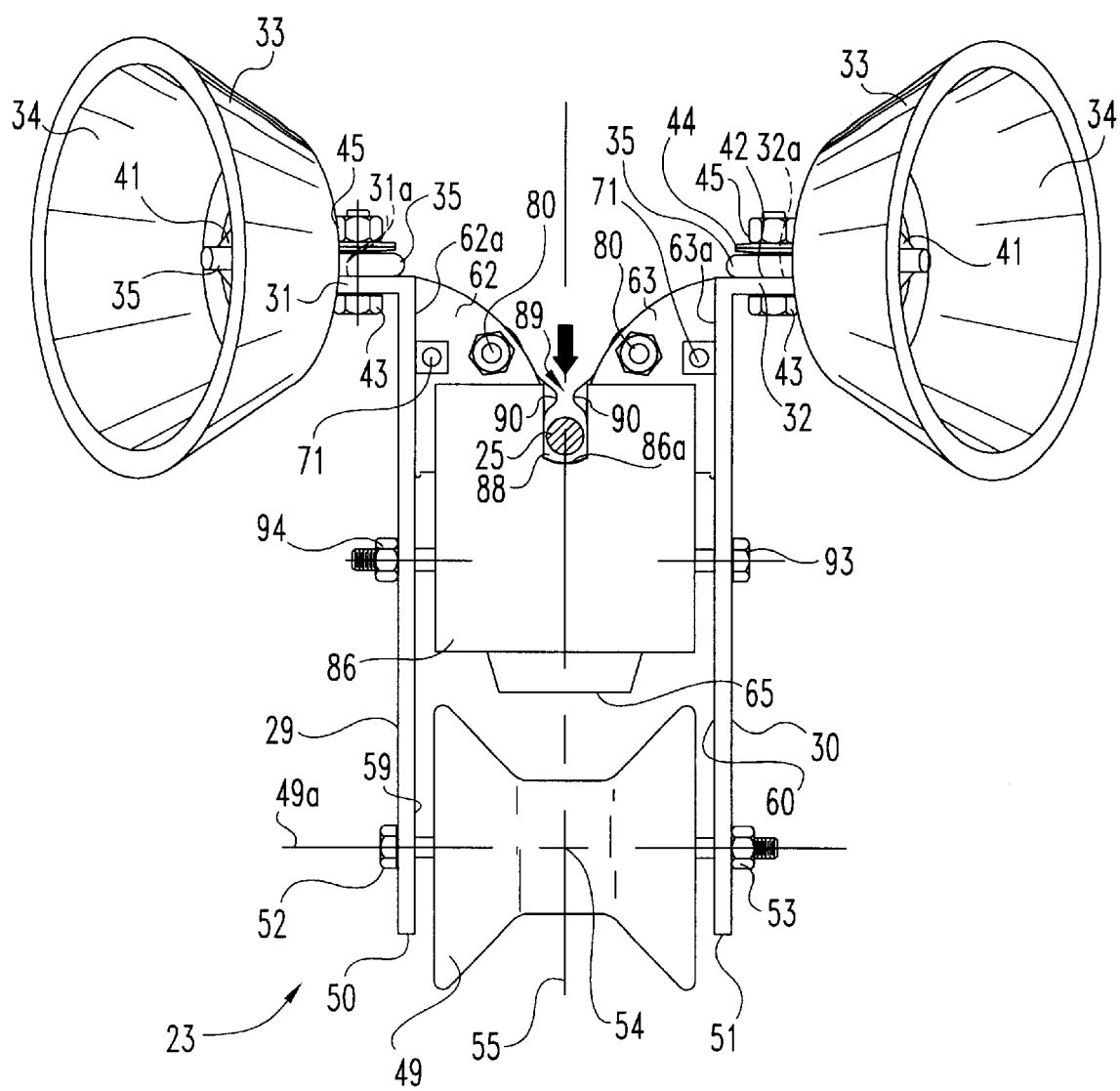
FIG. 4 is a top plan view of the FIG. 1 prior art latching mechanism in a closed condition.
Figure 5:
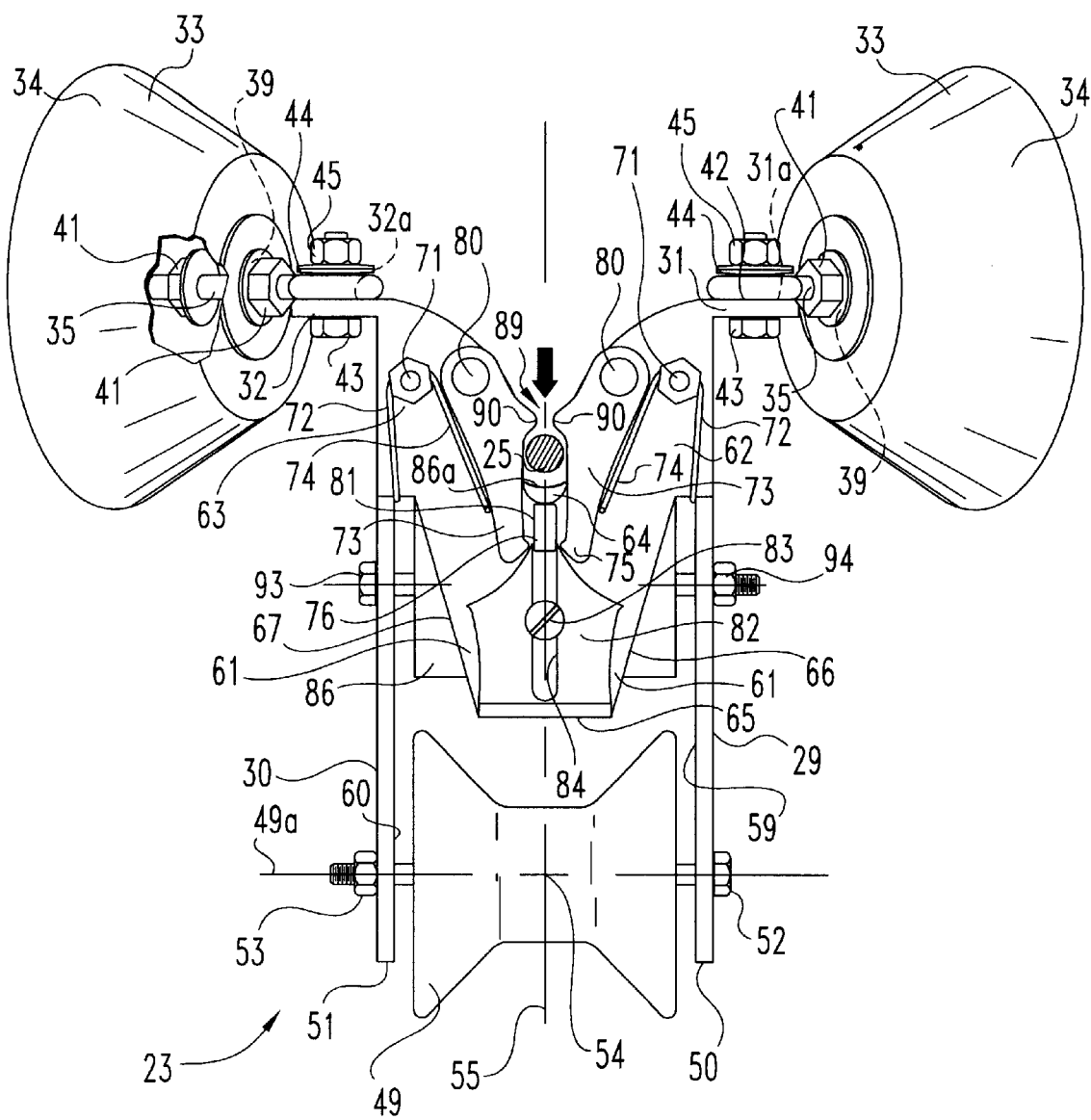
FIG. 5 is a bottom plan view of the FIG. 1 prior art latching mechanism in a closed condition.
Figure 6:
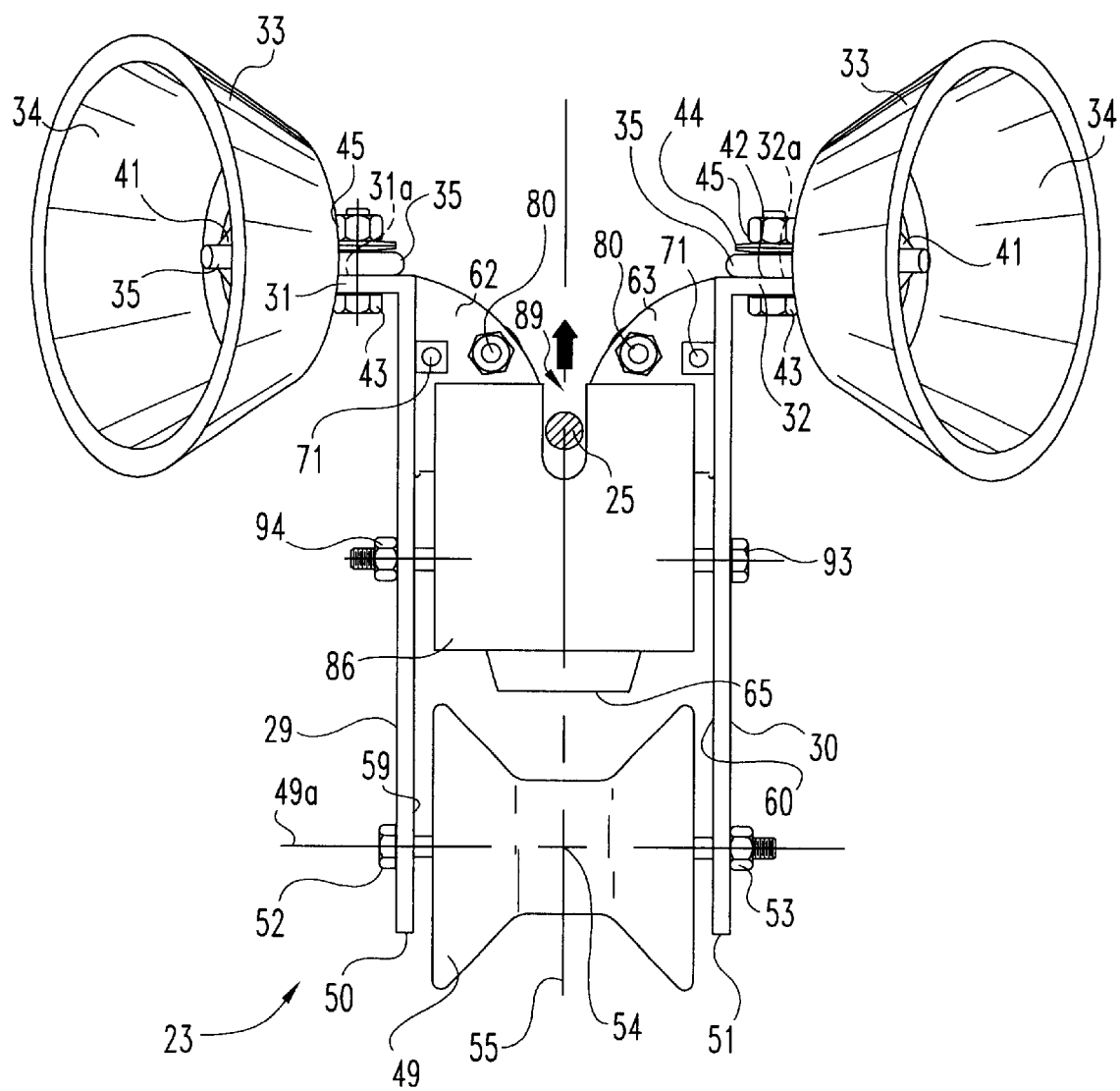
FIG. 6 is a top plan view of the FIG. 1 prior art latching mechanism in a manually opened condition.
Figure 7:
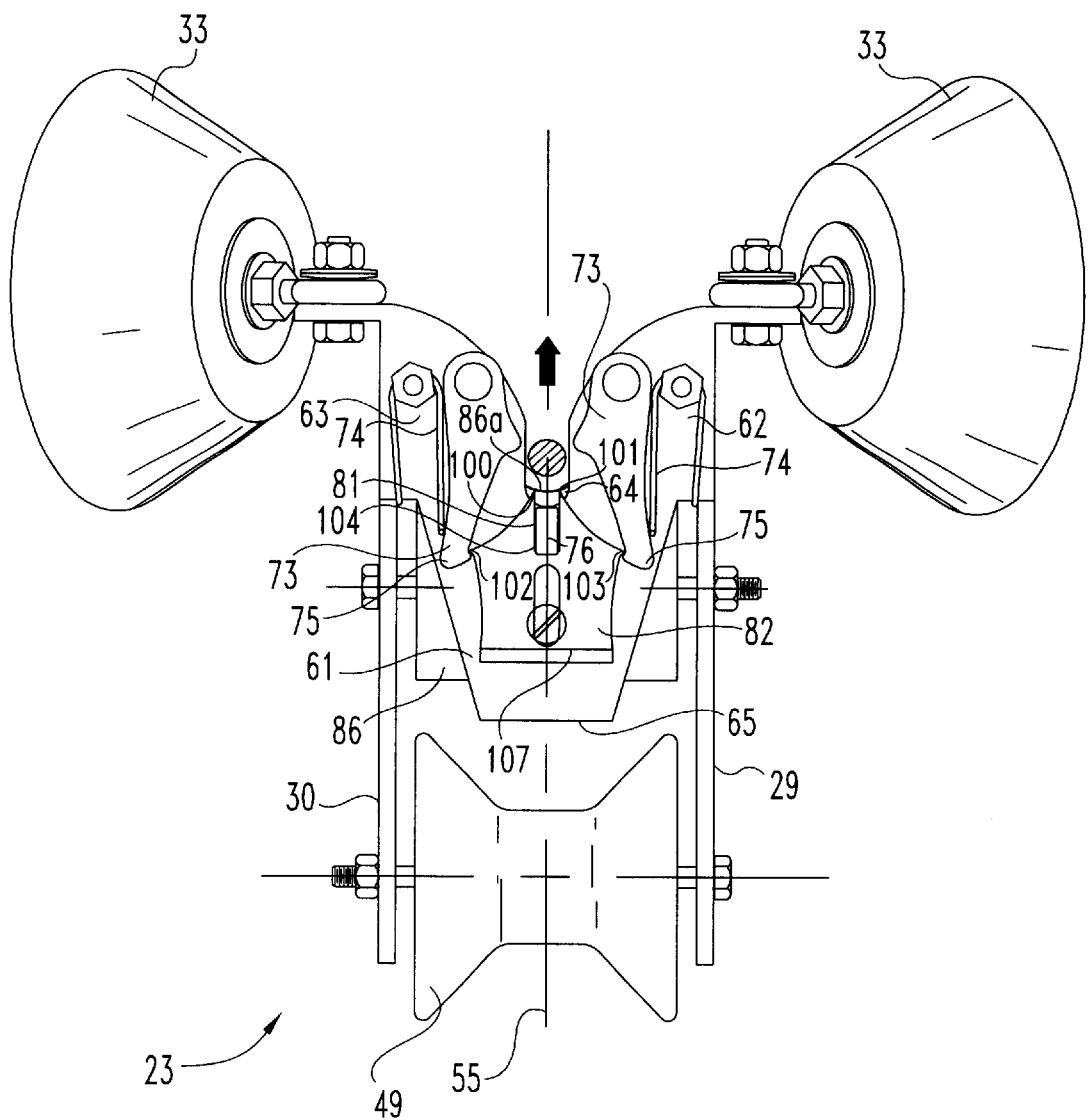
FIG. 7 is a bottom plan view of the FIG. 1 prior art latching mechanism in a manually opened condition.

With reference to FIGS. 2–7, the prior art latching mechanism 23 is illustrated in greater detail. FIGS. 2 and 3 illustrate the latching mechanism in a cocked and ready condition (i.e., unlatched) prior to receipt of the U-bolt 25. FIGS. 4 and 5 illustrate the latching mechanism 23 after it has opened and then closed around and through U-bolt 25 so as to securely hold the U-bolt and anchor the bow 24 of the boat 20 to the trailer 21. FIGS. 6 and 7 illustrate how the latching mechanism is manually opened to release the U-bolt 25 from the receiving channel.

The prior art latching mechanism 23 includes a unitary metal frame which includes two spaced-apart and oppositely-disposed side plates 29 and 30 which are each substantially flat and substantially parallel to each other. Each plate 29 and 30 includes a right angled end portion 31 and 32, respectively. Each end portion 31 and 32 defines a clearance aperture 31a and 32a, respectively. End portions 31 and 32 are preferably welded to the corresponding side plates. Pivotally attached via the respective apertures 31a and 32a to each one of the end portions is an alignment cone subassembly 33. Each alignment cone subassembly 33 includes a rubber cone 34, support arm 35, and conventional mounting hardware. Each cone has a central bore 39 which is located concentric with the annular centerline axis of each cone 34. Extending through bore 39 of each cone 34 is the externally threaded end of the support arm 35. Two hex nuts 41 threaded onto the end, one on each side of the cone, accompanied by various flat washers, secure the cone to the threaded end.

The hollow eye portion 42 of each support arm 35 is positioned in alignment with the corresponding clearance aperture, either 31a or 32a, and by means of hex head bolt 43 and a pair of abutting flanged hex nuts 44 and 45, each support arm is secured to its corresponding end portion. The hex nut portion of nut 44 is inserted into eye portion 42 and a ribbed washer base rests against the support arm 35 with the ribbed or serrated surface of the washer base facing away from the support arm. A ribbed surface of the washer base of nut 45 faces nut 44 such that the two ribbed surfaces of the corresponding washer bases abut against each other into a securely locked mechanical assembly. By loosening flanged hex nuts 44 and 45, the angle of tilt of the support arms 35 relative to the side plates 29 and 30 can be changed to accommodate the specific bow geometry of the boat 20 being loaded onto trailer 21. Once the proper included angle between the two rubber cones 34 is set by tilting each support arm 35, the mounting hardware is tightened.

A centered guide roller 49 is rotatably attached between and to the free ends 50 and 51 of side plates 29 and 30, respectively. The free ends 50 and 51 are each arranged with a series of clearance holes so that the guide roller 49 can be attached at different locations. The clearance holes in one free end are aligned with those in the other free end so that the centerline axis of rotation 49a is substantially perpendicular to longitudinal centerline 55. Bolt 52 and nut 53 provide the necessary mounting hardware. Flat washers are positioned on each side of guide roller 49 between the guide roller and the corresponding side plates. Roller 49 has a spool-like shape with a reduced diameter center portion 54 which is centered on longitudinal centerline 55. As the bow of the boat moves into the latching mechanism in the direction of free ends 50 and 51, the bow becomes wider and contact with the rubber cones 34 occurs. As this contact occurs, the leading edge of the keel contacts the guide roller 49. The latching mechanism may also tilt or pivot due to the weight of the boat and move support plate 61 so that it becomes substantially parallel with the boat keel.

Integrally formed as part of the unitary metal frame and joined at the inside facing surfaces 59 and 60 of side plates 29 and 30, respectively, is a unitary support plate 61. Plate 61 is shaped with oppositely-disposed side arms 62 and 63. Support plate 61 defines a central clearance slot 64 which is symmetric about centerline 55. Likewise, plate 61 is symmetric about centerline 55. Plate 61 has a straight end edge 65 and from that edge to the side plates 29 and 30, plate 61 includes diverging sides 66 and 67. In lieu of plate 61 being in unitary construction with side plate 29 and 30 to form the frame, a weldment is contemplated.

Bolted to each side arm 62 and 63, respectively, is a spring post 71. A coiled biasing spring wire 72 is anchored to each spring post 71. Pivotally attached to each side arm 62 and 63 is a latching jaw 73. The extending portion 74 of each wire 72 applies a moderate biasing spring force along the side of its corresponding latching jaw 73. This biasing spring force pushes the two ends 75 toward each other into virtual abutment against abutment block 76. Shoulder bolts 80 and conventional hex nuts and washers on the opposite side provide the pivoting connection and pivot point for jaws 73. The spring force which is exerted returns the latching jaws to the closed position and causes ends 75 to apply light pressure against block 76.

Abutment block 76 is positioned in slot 81 and is securely welded to support plate 61 at the end of channel 88. Positioned adjacent to block 76 is sliding release member 82 which is controlled and guided by screw 83 which is threadedly received by support plate 61 and which extends up through slot 84 which functions as an elongated bolt hole. Member 82 and its slot 84 are symmetric about centerline 55. Shock absorber pad 86 is a hard rubber pad which is bolted in position and centered on centerline 55. A bore is drilled through shock absorber pad 86 for securing that pad in position between the two side plates 29 and 30.

A latch channel 88 is defined by support plate 61 and is centered on centerline 55. Channel 88 is generally coincident with channel 64. Extending across the entrance 89 of channel 88 are jaw tips 90, one each being provided by each latching jaw 73. The base of channel 88 which is closed by block 76 is adjacent a cooperating edge 86a of pad 86. The proximity of the two tips 90 to each other effectively reduces the width of channel 88 such that the U-bolt is unable to pass between the two tips 90. The spring wires 72 maintain this closed condition of jaws 73 until the U-bolt 25 of the boat bow 24 is pushed into the latching mechanism 23 with enough force or momentum to overcome the spring-biasing force of spring wires 72. The leading side or bar of U-bolt 25 is represented in FIGS. 2 through 5 in cross sectional form, first as it is entering in the direction of the arrow (FIGS. 2 and 3) and then as it is received and latched (FIGS. 4 and 5). The facing jaw tips 90 can be thought of as having an entrance side that the U-bolt pushes against when entering channel 88. Likewise, the jaw tips 90 have an exit side which the U-bolt pushes against when trying to exit.

Bolt 93 and hex nuts 94 are used to secure the shock absorber pad 86 in position. The width of pad 86 relative to the spacing between facing surfaces 59 and 60 is sufficient to allow the spaced-apart support flanges 95 and 96 of clevis-type bracket arrangement 26 to be positioned therebetween as is illustrated. This is the method of attaching the latching mechanism 23 to the boat trailer 21. Since there is only a single line of attachment, it is possible for the latching mechanism 23 to pivot, typically in a counterclockwise direction based on the FIG. 1 view, due to the weight distribution of the assembly.

In use, the latching mechanism 23 is prepared for receipt of U-bolt 25 by being positioned in the orientation of FIGS. 2 and 3. This is the cocked and ready position, or what might be referred to as the unlatched position, for the latching mechanism 23. As the bow of the boat ramps up onto the boat trailer, the leading edge or leading post of the U-bolt, which is typically centered on the bow of the boat, may not be precisely on centerline 55 or at the right height. However, as the two alignment cones 34 are contacted by the bow of the boat, they function to direct and lift the bow of the boat and accordingly direct the U-bolt along centerline 55. As the front portion or post of the U-bolt begins to enter channel 88, the cone shaped roller 49 is contacted by the keel of the boat which pivots the latching mechanism in a clockwise direction (see FIG. 1). The bow of the boat is now in contact with rollers 34 and 49 and is substantially parallel to support plate 61 as the two tips 90 are contacted and a pushing force is applied on these tips by the U-bolt. The mass and speed of the boat override the very moderate spring force applied to the jaws by spring wires 72. Accordingly, the jaws open (i.e., the tips 90 separate). The front portion of the U-bolt 25 enters entrance 89 and the two jaws, now that the opening force is removed, spring back together so as to close entrance 89. The tips 90 extend toward each other and through the opening in the U-bolt. While the two tips may be slightly separated from each other, the clearance between the two tips is not sufficient for the U-bolt to pass therethrough. The shock absorber pad 86 provides a cushioning bumper for the leading edge of the U-bolt. Pad 86 is located by means of bolt 93 and when contacted by the U-bolt becomes trapped between side plates 29 and 30, support plate 61, and the bow of the boat.

Once the U-bolt is latched onto by latching jaws 73, it cannot pull loose. Any force exerted by the U-bolt in a reverse direction pushes back against tips 90. This in turn causes the jaws to try and pivot. One latching jaw tries to pivot in a counterclockwise direction while the other latching jaw tries to pivot in a clockwise direction. As should be understood, this pivoting motion of the two latching jaws brings ends 75 toward each other and toward abutment block 76. Consequently, as the U-bolt pushes against tips 90, this causes jaw ends 75 to push hard against abutment block 76.

Since ends 75 are initially set so as to be in virtual contact with block 76 and under spring pressure, there is effectively no pivoting movement allowed to either jaw. Consequently, jaw tips 90 do not move apart from one another and the U-bolt 25 is unable to pull free from its latched condition. The greater the force the U-bolt exerts on tips 90, the greater the pressure by ends 75 on block 76. However, the U-bolt 25 still will not be able to come unlatched as the separation between tips 90 is not sufficient for the U-bolt to pass therethrough. The boat may now be removed from the water without the operator leaving his seat. After leaving the loading ramp area, a bow line can be attached and tightened with a winch to prevent the boat from bouncing during transit.

When it is time to release the U-bolt in order to remove the boat from the trailer, the release member 82 is manually pushed in the direction of block 76 (see FIGS. 6 and 7). The pointed tips 100 and 101 which are wedged into the junction between jaw ends 75 and block 76 push against the junction, causing the jaws to pivot apart from each other. The pivoting action of the jaws overcomes the spring biasing force of spring wires 72 and the continued manually pushing on release member 82 causes the jaws to spread farther and farther apart until the tips 90 are effectively flush with the edges of the slot in support plate 61 (see FIG. 7). The tapering and diverging edges of release member 82 from tips 100 and 101 to securing tips 102 and 103 enables the separation of the jaws to be a relatively easy task. When tips 102 and 103 are reached by ends 75, the slight lip on each end 75 locks onto tips 102 and 103, holding the jaws in an open condition. The open front channel 104 in member 82 abuts up against block 76 in this position and the guide screw is positioned at the end of the center slot in member 82.

By placing the latching mechanism 23 in this held-open condition, the boat can be removed from the trailer without the need for someone to stand by the latching mechanism and hold it in an open condition. Once the U-bolt is freed from the latching mechanism, the lip 107 on the release member 82 is simply pulled back in order to release the two latching jaws 73 and allow them to return to the unlatched condition, ready to once again receive a U-bolt 25.

Figure 8:
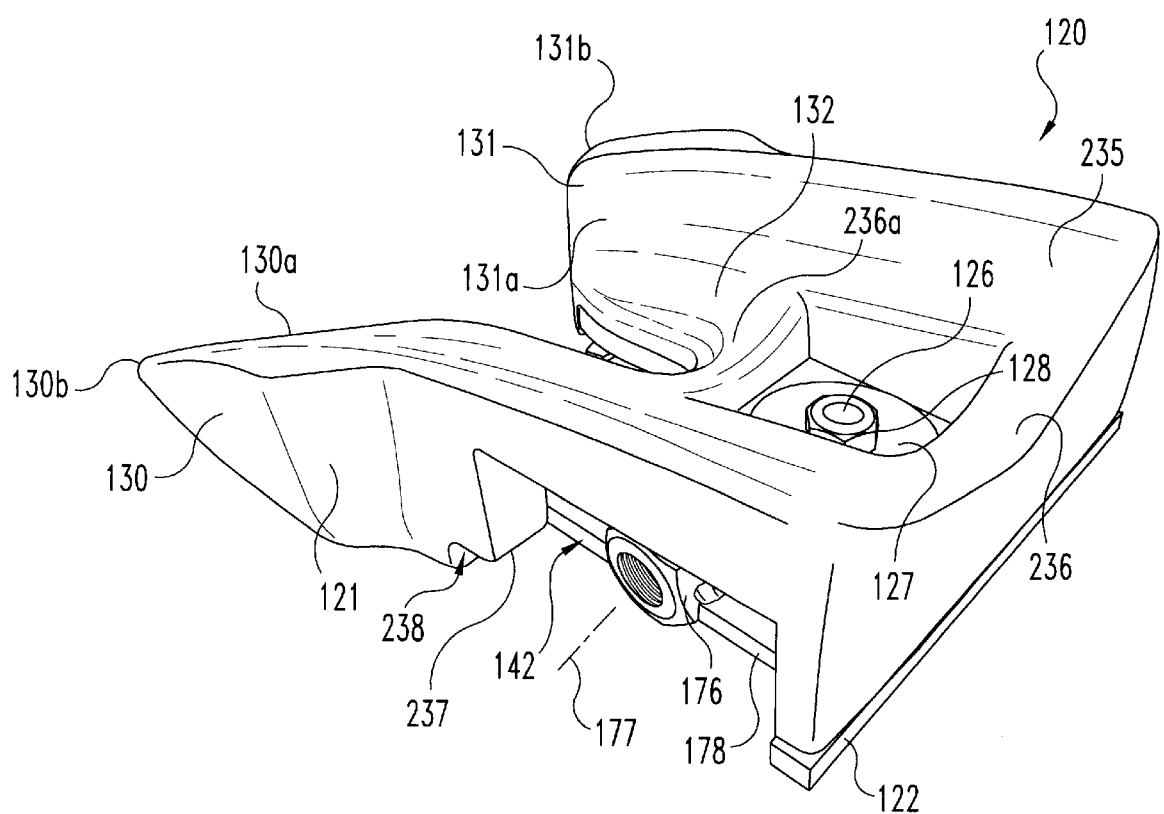
FIG. 8 is a top perspective view of a latching mechanism according to one embodiment of the present invention.
Figure 9:
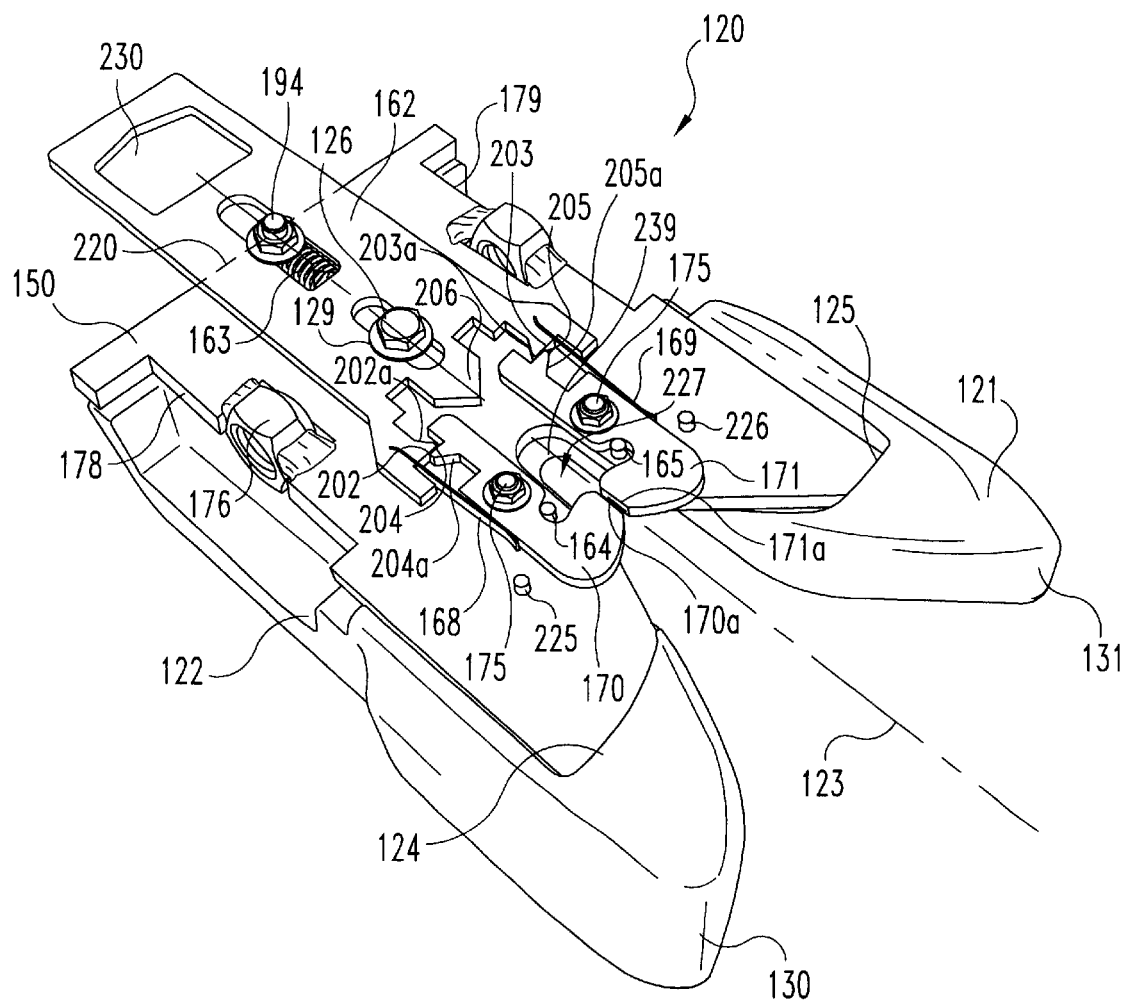
FIG. 9 is a bottom perspective view of the FIG. 8 latching mechanism in a ready-to-load condition.
Figure 10:
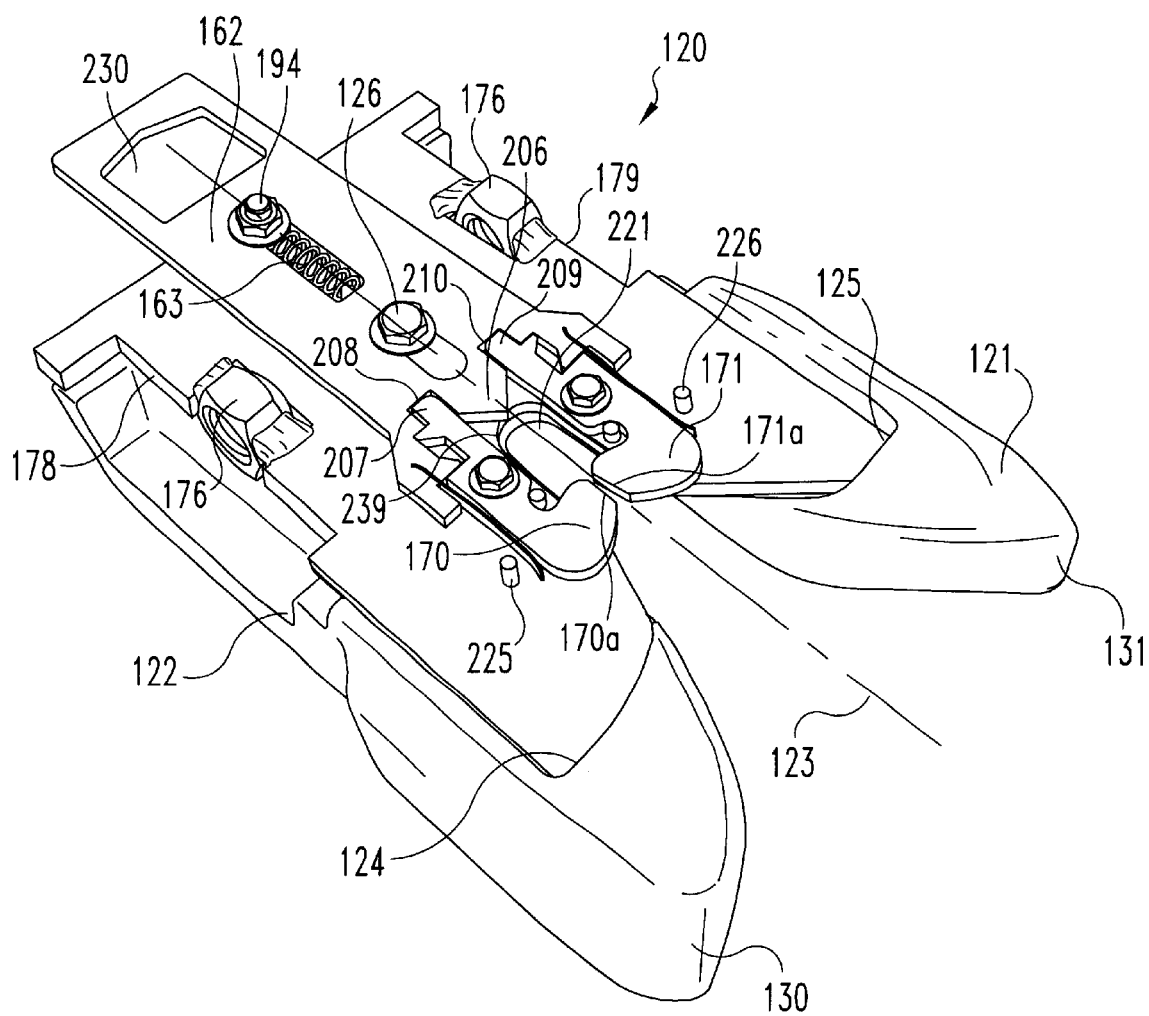
FIG. 10 is a bottom perspective view of the FIG. 8 latching mechanism in a stowed and locked condition (without the U-bolt).

Referring to FIGS. 8, 9, and 10, there is illustrated a latching mechanism 120 according to one embodiment of the present invention. Latching mechanism 120 includes a molded body 121 and a metal linkage subassembly 122 which is securely attached to the molded body 121 in order to create latching mechanism 120. The actual assembly between subassembly 122 and molded body 121 is by way of both edge interfits and a centered hex head bolt, washers, and hex nut combination. The edge interfits are on opposite sides of mechanism 120 centerline 123 at locations 124 and 125. The hex head bolt 126 extends through the linkage subassembly 122 from the underside and is locked in placed by a hex nut 126a on the opposite side of subassembly 122. This arrangement provides an adjustable clearance for the slide release member 162. When hex head bolt 126 and the locking hex nut 126a are pressed into and through bolt aperture 137, it determines their relationship. A modified flat washer 127 and hex nut 128 complete the assembly on the molded body side. A flat washer 129, under the head of hex head bolt 126, is used on the linkage subassembly 122 side. The molding material used for body 121 is preferably polyurethane, or a similar material, selected for its strength, durability, shapeability, weather-resistant properties, and the fact that it will not mark the boat.

The referenced clevis-type bracket arrangement 26 on the trailer can also be referred to as a winch stand and is configured with two spaced-apart metal panels. The latching mechanism 120 of the present invention fits between these two metal panels and is assembled to the two metal panels by means of two separate bolts 181 which are received by hex top locking nuts 176 (see FIG. 15). Flat washers 182 are included as part of the mounting hardware. It is intended for each metal panel of the winch stand to abut up against its corresponding hex nut 176 and the adjacent edge 178 and 179.

Figure 14:
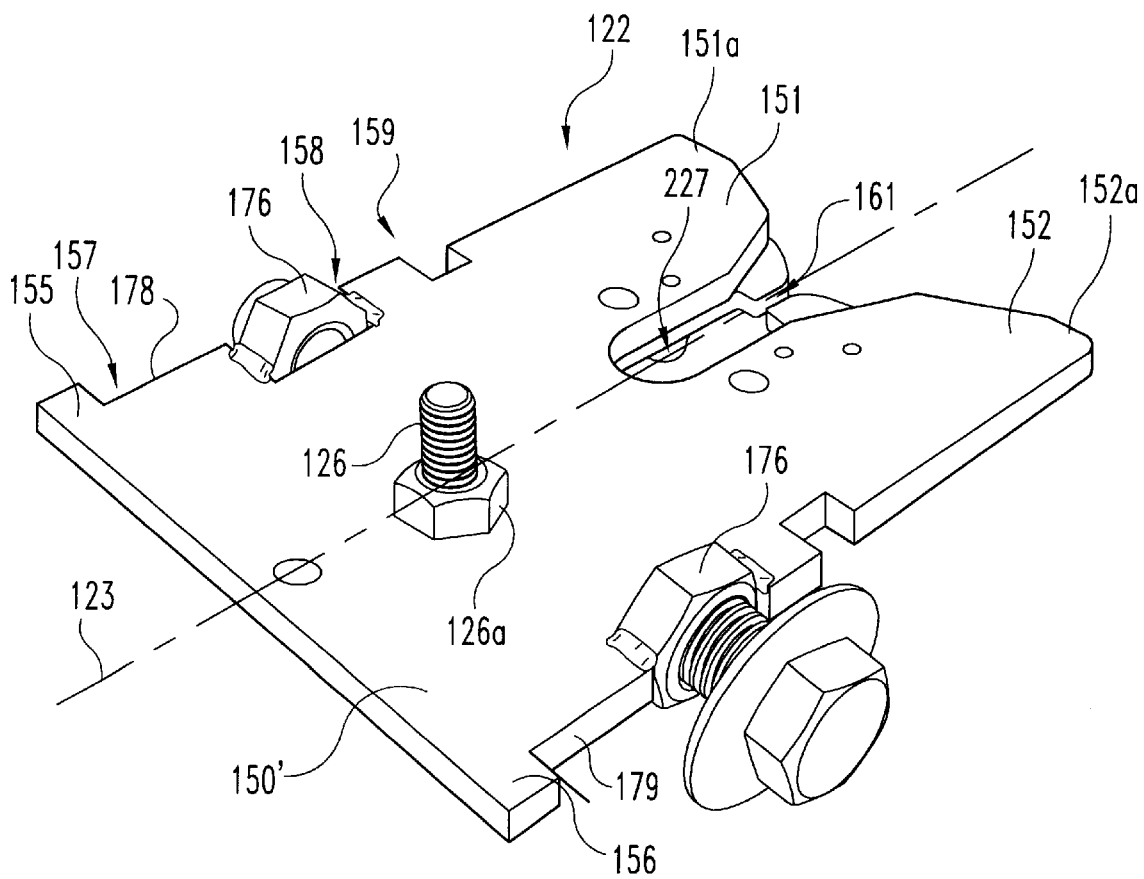
FIG. 14 is a top perspective view of a metal linkage subassembly comprising one portion of the FIG. 8 latching mechanism.
Figure 15:
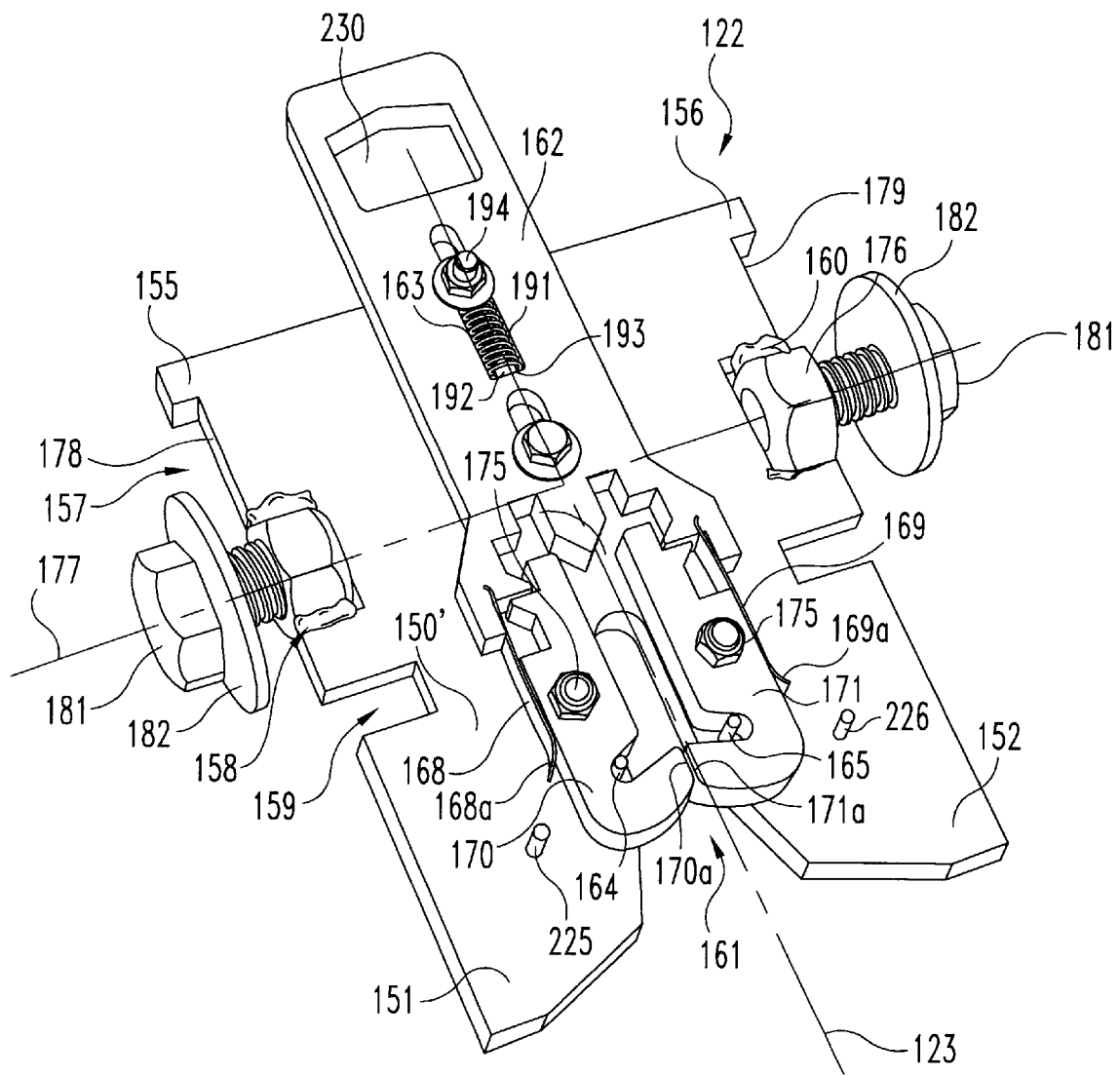
FIG. 15 is a perspective view of the bottom surface of the FIG. 14 metal linkage subassembly in a ready-to-load condition.
Figure 16:
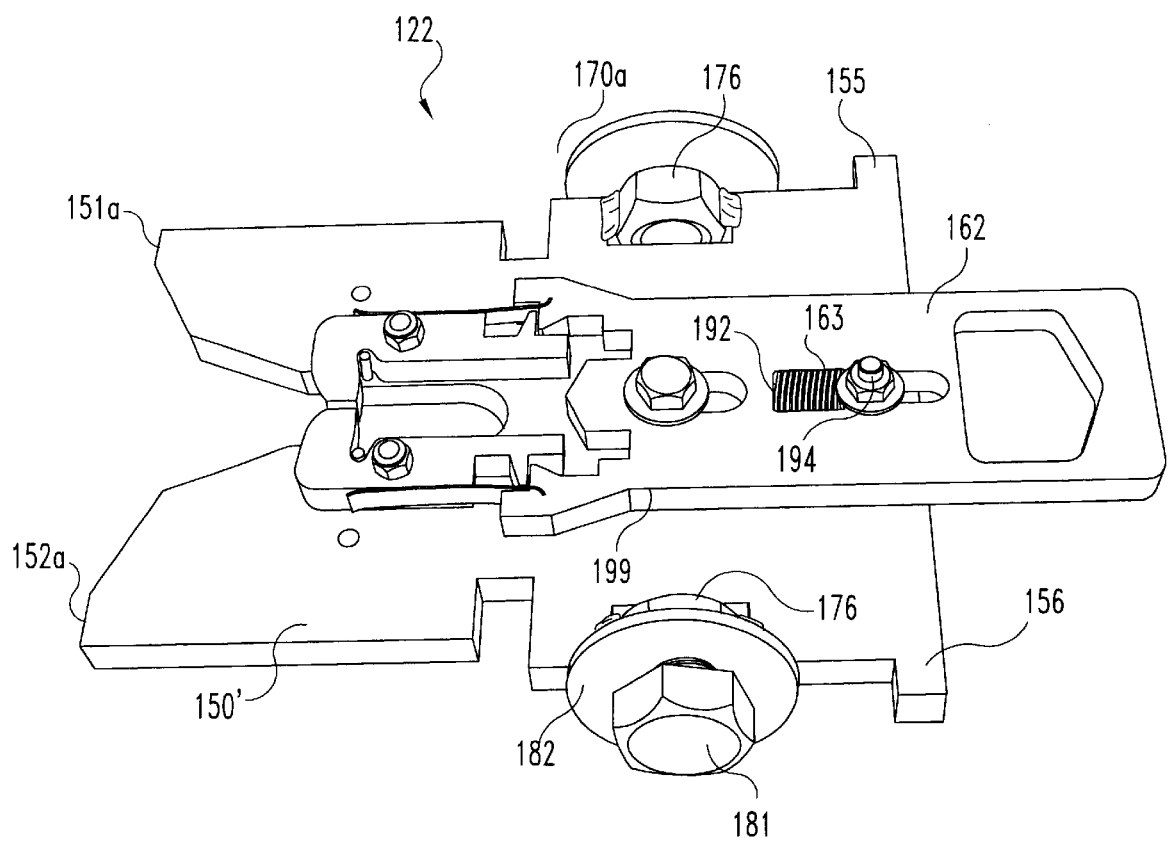
FIG. 16 is a side perspective view of the FIG. 14 metal linkage subassembly with mounting hardware.

While some of the assembly details will be described in the context of FIGS. 15, 16 and 17, the point to be made at this stage is that the typical spacing between the two metal panels of the winch stand is either three (3) inches or four (4) inches. Accordingly, the unitary metal frame or base plate 150 (and 150') is designed with two embodiments. There is a 3 inch version as well as a 4 inch version. FIGS. 8, 9 and 10 use metal frame 150 which is the 3 inch embodiment. FIGS. 14, 15, and 16 use metal frame 150' which is the 4 inch embodiment. While these two metal frame embodiments 150 and 150' are virtually identical in all other respects, the width is different as would be required for proper assembly to the winch stand, depending on whether the two metal panels have a 3 inch or 4 inch spacing. The two versions of the present invention, specifically the 3 inch version and the 4 inch version, refer to the spacing between edges 178 and 179. While mounting nuts 176 which are welded into position are flush with the corresponding edges 178 and 179, the ½ inch width difference between the two embodiments is revealed by the overhang of the metal frame edges beyond the sides of the molded body in the 4 inch embodiment. As would be understood, for a 3 inch winch stand spacing, the 3 inch version of the present invention is selected. For a 4 inch winch stand spacing, the 4 inch version of the present invention is selected. In the drawings, the particular version which is illustrated has been noted, but in view of the minimal difference between the two versions, two complete sets of illustrations, one for each of the two versions, is not necessary for a complete understanding of the present invention.

The molded body 121 (see FIG. 11) is shaped and contoured in order to provide the desired surfaces, geometries and relationships to enable the bow 24 of the boat 20 to be guided and received so that in turn the U-bolt 25 on the bow centerline is received by latching mechanism 120. There obviously are differences between mechanism 23 (the prior art) and mechanism 120 (the present invention). For example, the rubber cone subassemblies 33 are eliminated and replaced by protruding portions 130 and 131. These two protruding portions have facing curved edges 130a and 131a, respectively, and outer tips 130b and 131b. Prior shock absorber pad 86 is now duplicated by a mismatch between the molded body 121 and subassembly 122 in the area (base) of receiving slot 135.

In order to simplify the description and understanding of latching mechanism 120, it should be understood that the entirety of the molded body 121 is symmetrical about centerline 123. Likewise, the entirety of the metal linkage subassembly 122 is symmetrical about centerline 123. This design symmetry applies to protruding portions 130 and 131, as illustrated.

Another design change from mechanism 23 to mechanism 120 includes the elimination of centered guide roller 49, replacing it with curved (concave) support surface 132. Other design changes include the replacement and/or re-design of side plates 29 and 30, now shaped as part of molded body 121. Still further changes exist between the prior art design of latching mechanism 23 and the preferred embodiment of the present invention represented by latching mechanism 120. The majority of these still further changes are integrated into the size, shape, and geometry of molded body 121 and the positioning and interfit of the linkage subassembly 122 into and onto the molded body 121. As far as the specifics of the linkage subassembly 122, the design and operation of subassembly 122 includes a number of similarities to the design and operation of the corresponding subassembly portion of latching mechanism 23. The similarities and differences between latching mechanism 120 and latching mechanism 23 will be apparent once the details of latching mechanism 120 are described.

Figure 11:
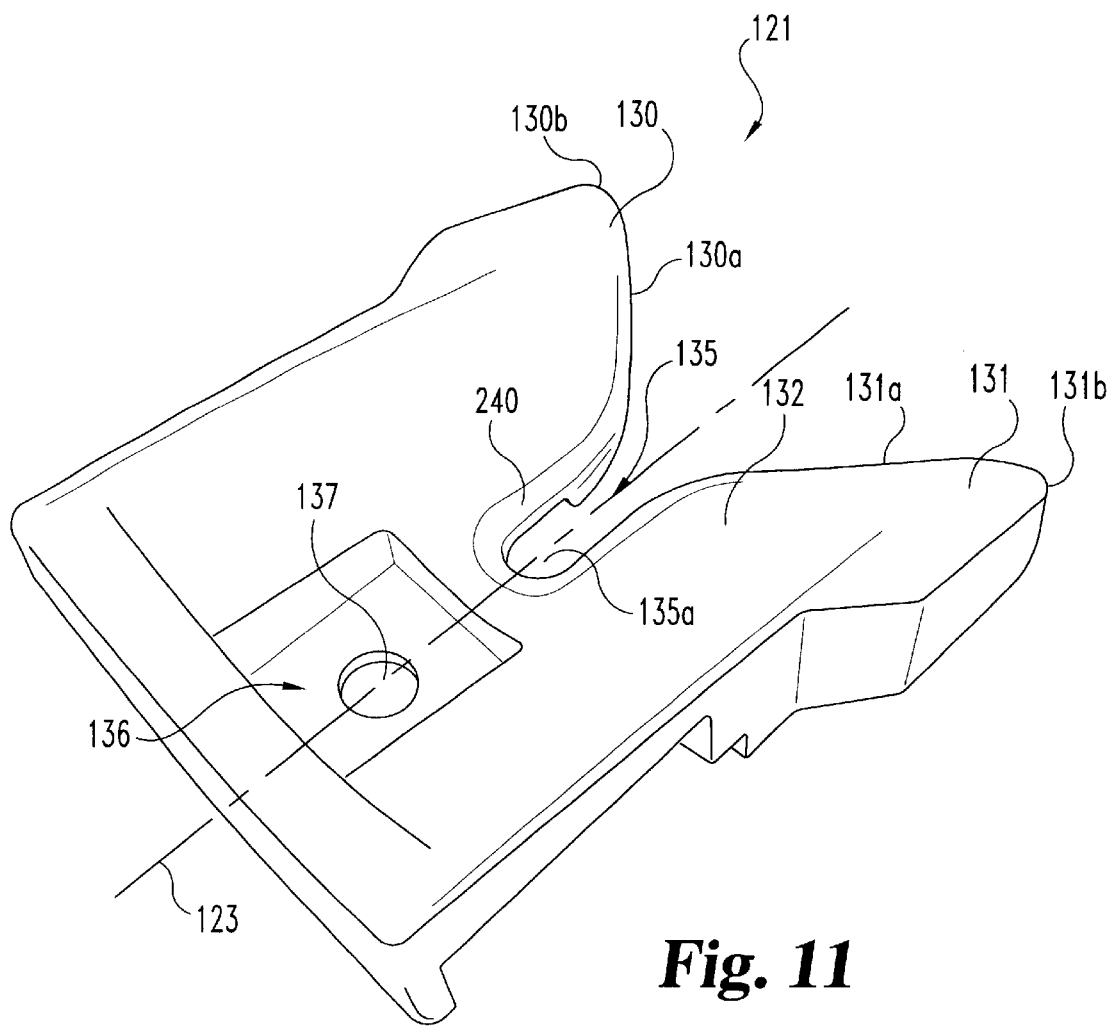
FIG. 11 is a top perspective view of a molded body comprising one portion of the FIG. 8 latching mechanism.
Figure 12:
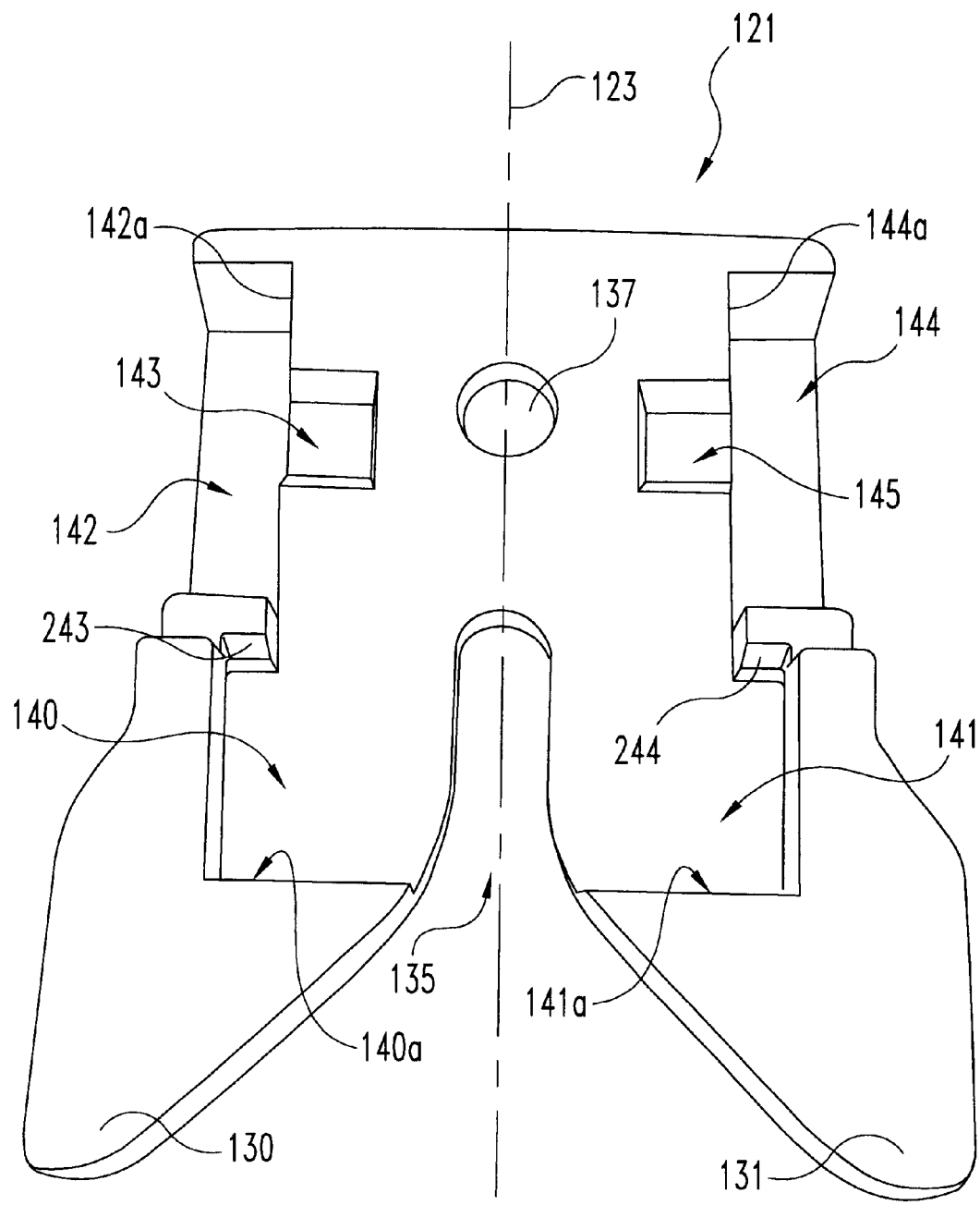
FIG. 12 is a perspective view of the bottom surface of the FIG. 11 molded body.
Figure 13:
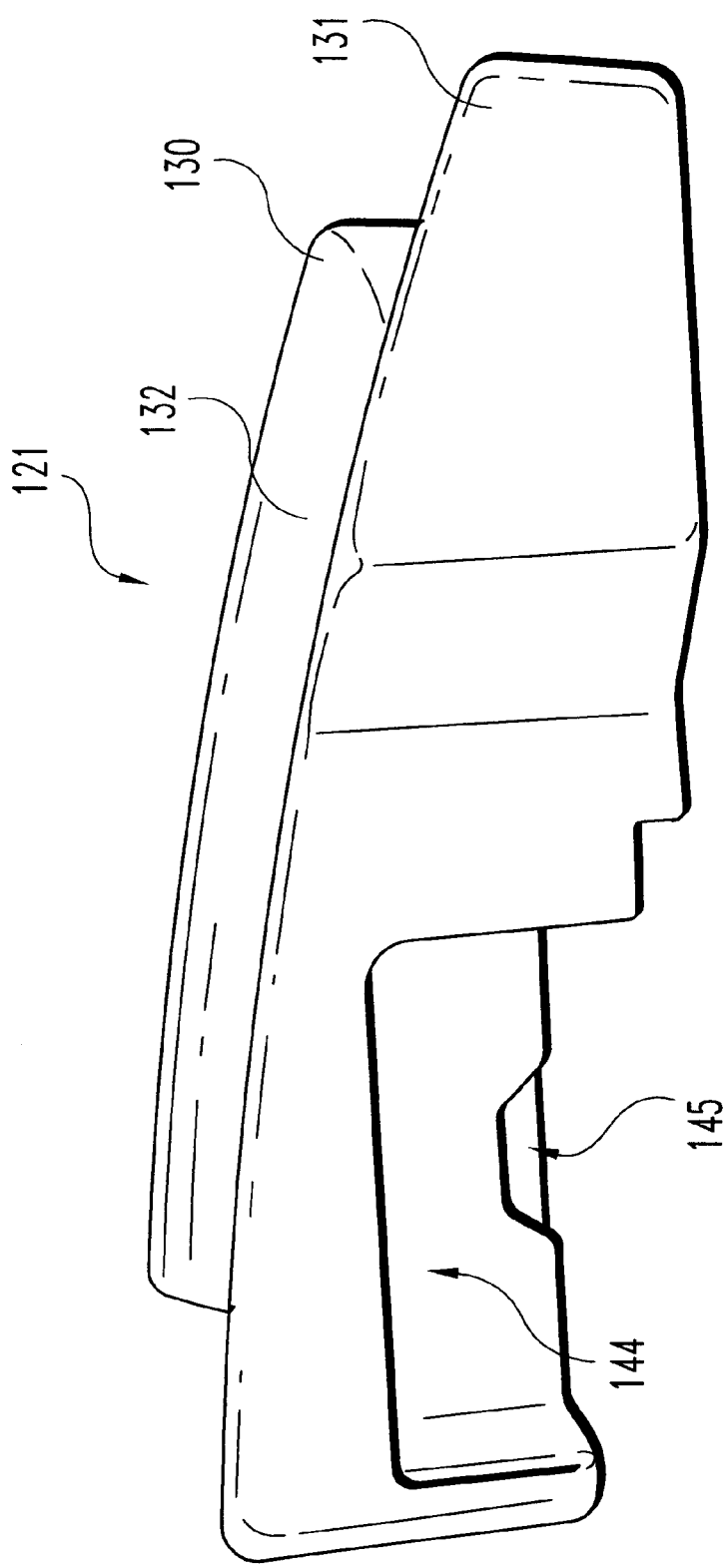
FIG. 13 is a side elevational view of the FIG. 11 molded body.

With continued reference to FIG. 11 and with reference to FIGS. 12, and 13, the molded body 121 is illustrated in greater detail. Body 121 includes, in addition to protruding portions 130 and 131 and in addition to support surface 132, a centered receiving slot 135, a generally square recess 136, and bolt aperture 137, all of which are located on or in what is the top side or surface of the molded body 121 when latching mechanism 120 is properly installed. The underside of the molded body 121 includes additional contours and recesses for receiving the metal linkage subassembly 122 as part of the assembled latching mechanism 120. These contours and recesses are arranged symmetrically on opposite sides of centerline 123 and the actual shape of each one and its corresponding location is dictated in part by the features and configuration of the metal linkage subassembly 122. The recessed areas include the generally square-shaped areas 140 and 141, the generally rectangular areas 142, 143, 144, and 145.

Areas 140 and 141 are located in the corresponding protruding portions 130 and 131, respectively. A slight undercut 140*a* and 141*a*, each in the form of a blind slot, is included in each corresponding protruding portion and is located beyond the forward edge of areas 140 and 141, respectively. The material thickness of each protruding portion enables the fabrication of undercut slots 140*a* and 141*a* and these slots each receive a corresponding protruding tip of the metal linkage subassembly 122, to be described hereinafter.

Areas 142 and 144 are each sized and arranged to receive a corresponding one of the metal panels of the winch stand. As explained, the standard widths for the winch support bracket or winch stand are 3 inches and 4 inches. Molded body 121 is designed for a 3 inch spacing based on the approximate 3 inch spacing between surfaces 142*a* and 144*a*. When a 4 inch winch stand is present, the sides of the linkage subassembly 122, with the cooperating hex nuts 176 as welded to those sides, extend beyond surfaces 142*a* and 144*a*. The two securing bolts 181 fit into the hex nuts 176 and areas 143 and 145 provide clearance relief for these welded-in hex nuts. These features and components of metal linkage subassembly 122 will be described in greater detail hereinafter.

Referring now to FIGS. 14, 15, and 16, the structural and functioning details of the metal linkage subassembly 122 will be described. As explained, this linkage embodiment includes the 4 inch embodiment of the unitary metal frame 150'. Noting this difference, all other reference numbers used for the 3 inch embodiment of FIGS. 8, 9 and 10 are retained simply for clarity. While some of the component parts have already been mentioned in the context of the recesses and relief areas of the molded body, additional details of these features and component parts are included. However, since the general operation and sequence of operation of metal linkage subassembly 122 is similar to that of latching mechanism 23, except as already noted, the primary focus of the following description will be on those areas of re-design.

More specifically, metal linkage subassembly 122 includes a unitary metal frame 150' which is symmetrically configured on opposite sides of centerline 123. Unitary portions of this frame include protruding portions 151 and 152, tips 151*a* and 152*a* of those protruding portions, side prongs 155 and 156, rectangular relief areas 157, 158 and 159, on each side, and entrance 161. Additional component parts of metal linkage subassembly 122 include release slide 162, spring 163, abutment posts 164 and 165, biasing stainless steel strips 168 and 169, and cooperating latching jaws 170 and 171. The latching jaws 170 and 171 are pivotally attached to each protruding portion 151 and 152, respectively. The extending portion 168*a* and 169*a* of each spring strip 168 and 169, respectively, applies a moderate biasing spring force along the side of its corresponding latching jaws 170 and 171. This biasing spring force pushes the two jaw faces 170*a* and 171*a* toward each other into virtual abutment. Threaded studs 175 are welded into metal linkage subassembly 122 and conventional nylon insert hex lock nuts provide the pivoting connection and pivot point location for latching jaws 170 and 171. The spring force which is exerted only needs to return the latching jaws to the closed position.

Relief areas 158 each receive a hex nut 176 which is securely welded to the opposite edges of its corresponding relief area 158. The threaded inside surface (ID) of each hex top lock nut 176 is concentric to lateral centerline 177. This centerline represents the axial centerline of the mounting holes of the winch stand to which latching mechanism 120 is to be attached. This lateral centerline 177 also represents the centerline of the attaching bolts which are received by the hex top lock nuts 176. Lateral centerline 177 extends through the body of frame 150' and, in view of this centerline location, a through-bolt, as used with the prior art design, cannot be used. In this regard, it is important to consider the design comparison of FIG. 17.

As previously indicated, standard winch stands or winch support brackets have a pair of spaced-apart support arms (metal panels) which extend upwardly from the tongue of the trailer and are currently set at either a three inch wide spacing or a four inch wide spacing. These winch support arms are identified as support flanges 95 and 96 in the FIG. 1 illustration. In order to "fit" the winch stand spacing, the latching mechanism 120 needs to set the edge-to-edge dimension from edge 178 to edge 179 at approximately three inches or four inches depending on the embodiment. To be exact, the inside spacing or dimension between the upright arms of the winch stand should equal the dimension from edge 178 to edge 179. In this manner, the winch arms abut up against these two surfaces for a precise fit. However, due to flexibility, albeit to a limited degree, of the winch stand support arms, the actual dimension between edge 178 and edge 179 can be set at a nominal dimension of three inches or four inches and the winch stand support arms will either spring apart slightly to fit or will be pulled in slightly with the mounting bolts 181. This description applies to the 3 inch frame 150, but the same is essentially true for the 4 inch spacing corresponding to the second style of the present invention, using frame 150'.

Figure 17:
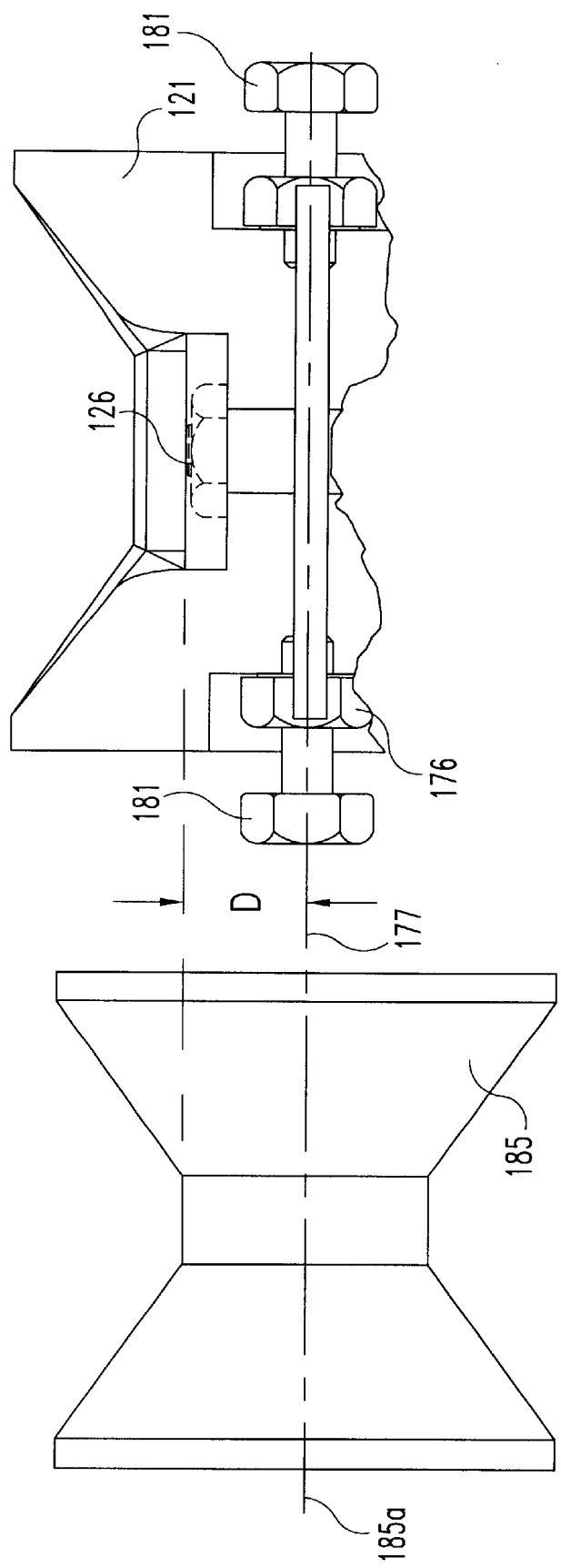
FIG. 17 is a diagrammatic front elevational view explaining the dimensional relationship between two designs.

With reference to FIG. 17, the left side illustrates a conventional bow roller 185 and its axis of rotation 185*a*. On the right side is a diagrammatic representation of the molded body 121 of the present invention and where the axis of rotation, now lateral centerline 177, falls relative to bolt 126 and molded body 121. In order to provide the same centerline location and axis of rotation, a change needs to be made for latching mechanism 120 relative to latching mechanism 23. As such, the use of two separate sets of spaced-apart mounting hardware, as contrasted to a single through-bolt or threaded rod, represents and important design improvement for the present invention. While the present invention is believed to represent an improved design in this respect, a more significant aspect of using two separate, spaced-apart mounting subassemblies relates to the overall thickness of the metal linkage subassembly 122 and the vertical dimensions which can be achieved or preferably need to be established for the preferred receipt of the bow of the boat.

Most small boat manufacturers use boat trailers with a series of guide rails that support the boat when fully loaded and have guided the boat bow to a position where the U-bolt is against the bow roller and the keel is resting on top. If a through-bolt would be used, it needs to be lowered away from the upwardly facing surface of the molded body 121 so that its passage from one side to the opposite side does not interfere with the release slide 162 nor with the connecting bolt 126. Moving the through-bolt "lower" now impacts upon the pivot axis of the linkage mechanism relative to the winch stand and has raised latching mechanism 120 by the amount of clearance required. The winch stand would now have to be adjusted down this same amount or latching mechanism 120 would raise the boat off the rails when the boat is fully loaded. Since the guide roller 49, the two alignment cone subassemblies 33, and the shock absorber pad 86 of latching mechanism 23 have all been replaced by the molded body 121 of latching mechanism 120, the size and shape of the molded body have to be factored into other design aspects of latching mechanism 120.

The new design mechanism 120 replaces a bow roller without having to adjust the winch stand. This is possible because the distance from the centerline of the two mounting bolts 181 to the boat keel contact surface of the mechanism 120 is the same distance as it is from the centerline of the through bolt to the contact surface of the roller, (see FIG. 17). Distance D is the same in both FIG. 17 embodiments and the bolt 126 and lock nut 126a are below the keep contact surfaces. The result is to allow the new design to replace the conventional bow roller 185 without requiring the winch stand to be vertically adjustable.

Another design improvement provided by the disclosed embodiment of the metal linkage subassembly 122 is the use of a biasing spring 163 for the release slide 162. As illustrated in FIGS. 14, 15, and 16, the release slide 162 is slotted so as to create a clearance space 191 for receipt of spring 163. A small nib 192 at edge 193 provides a first support for spring 163. The opposite end of the spring 163 abuts up against threaded stud 194 which is welded into frame 150 (and 150'). This allows the spring body to remain on the centerline of release member 162. The positioning of the body of the threaded stud 194 allows total spring compression and acts as a second release slide guide. A nylon insert lock nut provides adjustable clearance for the release slide.

In operation, beginning with latching mechanism 120 in the ready-to-load (and ready-to-launch) condition of FIG. 9, the release slide 162 is in its full-back position. The U-bolt 25 (not illustrated) enters (or leaves) along centerline 123 and it pushes on jaws 170 and 171 and these jaws pivot around studs 175. As the jaws pivot, their distance of separation along edges 170a and 171a increases and the U-bolt 25 is able to pass. Initially the release slide 162 is in a spring-loaded condition with spring 163 compressed. The release slide cannot move forward since its edges 202 and 203 are in abutment against edges 204 and 205 of jaws 170 and 171, respectively. As the jaws pivot, so as to open, the edges 202 and 204 and the edges 203 and 205 come out of abutment with one another. This allows spring 163 to push the release slide 162 forward and the mechanism stowed and locked position of FIG. 10 is achieved. Protruding tip 206 ensures that the squared end 207 of jaw 170 fits into recess 208 and that the squared end 209 of jaw 171 fits into recess 210.

The abutment posts 164 and 165 which can be configured as drive screws are equally spaced on opposite sides of centerline 123 in order to help set the parting line of jaw edges 170a and 171a coincident with centerline 123. The stainless steel strips 168 and 169, which are made of hardened stainless steel, push their corresponding jaws 170 and 171 against the corresponding posts 164 and 165. The flat edges 170a and 171a are specifically designed with a length along centerline 123 that requires some degree of passage time for the U-bolt to actually clear the jaws. During this "passage time", the squared ends of the jaws cannot indent into the recesses of the release slide. This "passage time" gives the release slide time to move forward and assume the necessary position for the FIG. 10 configuration.

The configuration of latching mechanism 120 in FIG. 9 represents both the ready-to-load condition and the ready-to-launch condition. As an aid to identify this dual a condition and to identify the proper position of release slide 162 to the user, a line is etched on the top side of release slide 162 at a location (see broken line 220) coinciding with the edge of frame 150.

The configuration of latching mechanism 120 in FIG. 10 represents the stowed and locked condition of latching mechanism 120, with the U-bolt (not illustrated) captured in area 221. Any attempt to pull the U-bolt out of its captured position applies a force on ends 207 and 209 of jaws 170 and 171, respectively, and this force pushes on the opposite sides of protruding tip 206, preventing any noticeable pivoting motion of jaws 170 and 171 and clearly not enough movement of the jaws to open wide enough to release the U-bolt. The two drive screws 225 and 226 are positioned so as to limit the maximum pivoting movement of jaws 170 and 171. When a ½ inch diameter U-bolt is present, the width of the clearance slot 227 adjacent to entrance 161 is closely sized so that excess jaw movement is not a concern and drive screws 225 and 226 are not used. However, if a ⅜ inch diameter U-bolt is present, it is possible that, with a misaligned entry, one jaw or the other could pivot too far and allow the U-bolt to enter without releasing slide 162. The drive screws 225 and 226 prevent this possibility.

When it is time to launch the boat, it is necessary to convert the configuration of latching mechanism 120 from the FIG. 10 condition back to the FIG. 9 condition. In order to do so, the release slide 162 is moved back with approximately ½ inch of travel, away from the U-bolt. This movement can be performed manually or by a solenoid mechanism (see FIG. 18). This step compresses the spring and pulls the protruding tip 206 out of abutment alignment with the squared ends 207 and 209 of the jaws. This frees the squared ends of the jaws to pivot toward centerline 123 as the angular surfaces of the release slide 202a and 204a contact the angular surfaces of the jaws 203a and 205a. This is considered to be a ready or cocked condition when surfaces 202 and 204 and 203 and 205 are in abutment. As the U-bolt attempts to pull out, it applies an opening force on jaws 170 and 171, causing the flat jaw edges 170a and 171a to separate and thereby creates a sufficient clearance for the U-bolt to release. As this occurs, the squared ends move together toward centerline 123 which releases the slide 162 back to the FIG. 10 position. Once the U-bolt is released, the stainless steel strips 168 and 169 spring bias the jaws back into the FIG. 9 condition as the release slide is pulled back to the launch-load position. You may now re-load the U-bolt into a locked position. The movement and positioning of the release slide 162 controls the condition and orientation of the latching mechanism 120.

If the U-bolt happens to be jammed against the jaws in its stowed condition because the boat has shifted back on the trailer, pulling on the release slide 162 in an effort to unlock the jaws is aided by the U-bolt pressure. This is true because the jaws of this invention pivot away from the trapped U-bolt. The prior invention, see FIG. 5, shows that the tips 90 pivot toward the U-bolt as slide 82 is pushed forward. This would not be possible if the U-bolt was against the jaws. The hole 230 in the release slide 162 is designed to receive a winch strap snap which can be used to help with the release of the U-bolt if it is jammed.

Some of the additional design features of the present invention will now be described with reference to specific drawings. While these design features are each important to the overall design of latching mechanism 120, they primarily represent refinements to the basic theory of operation.

With reference to FIG. 8, bolt axis centerline 177 represents the axis of rotation or pivoting for latching mechanism 120 as mounted to the winch stand. The mounting location at nut 176 for the winch stand and the tightening torque on bolts 181 is set so as to permit latching mechanism 120 to pivot forward and downward in a counter clockwise direction, as viewed in FIG. 8, to an inclined orientation, when not in use. By using the correct bolt length and washer combination, bolt 181 can bottom against edges 178 and 179 for added strength and still pivot. As the keel of the boat approaches latching mechanism 120, the angle of attack of the keel may not necessarily coincide with the pivot angle or angle of incline of latching mechanism 120. However, the latching mechanism 120 is able to pivot, typically in a clockwise direction, to match the keel angle of attack. The curvature of surface 235, including edges 236 and 236a, provides a guide and an alignment surface for the bow and keel of the boat as it ramps up onto the trailer and onto latching mechanism 120.

Recessed relief area 142 (see FIG. 12) provides clearance for one upright metal panel of the winch stand. On the opposite side of latching mechanism 120, relief area 144 provides clearance for the other metal panel of the winch stand. While areas 142 and 144 are oversized for clearance of these metal panels, the added clearance in the width dimension, front to back, allows the latching mechanism 120 to pivot (as described) into an inclined orientation as it is readied to receive the boat and the U-bolt. In order to control the degree of counterclockwise pivoting and to prevent the latching mechanism from going vertical, edge 237 functions as an abutment edge and limits the amount of Counter clockwise pivoting which is permitted. Relief area 238 provides the necessary clearance for the remainder of the winch stand.

With reference to FIGS. 9, 10, and 11, it should be noted that the curved base 135a of clearance slot 135 of molded body 121 has a slight (⅜ inch) mismatch with the base of clearance slot 227 of the metal linkage subassembly 122. This mismatch results in a small strip 239 of the molded body extending forward, toward the U-bolt, such that it will be contacted by the U-bolt before there is any contact between the U-bolt and the base of slot 227. In this way, the small strip 239 serves as a shock absorber. With continued reference to FIG. 11, relief area 240 is designed to accommodate the nut on the U-bolt while the U-bolt bottoms out against the base 135a of clearance slot 135.

With reference to FIG. 12, surfaces 243 and 244 are molded at an angle or downward/forward incline so that they can serve as guide ramps for the assembly of the metal linkage subassembly 122. As has been described, the forward tips 151a and 152a (see FIG. 14) of the linkage subassembly 122 are received by undercut slots 140a and 141a in the molded body. These two ramp surfaces provide clearance and help to guide the linkage subassembly 122 into position.

Figure 18:
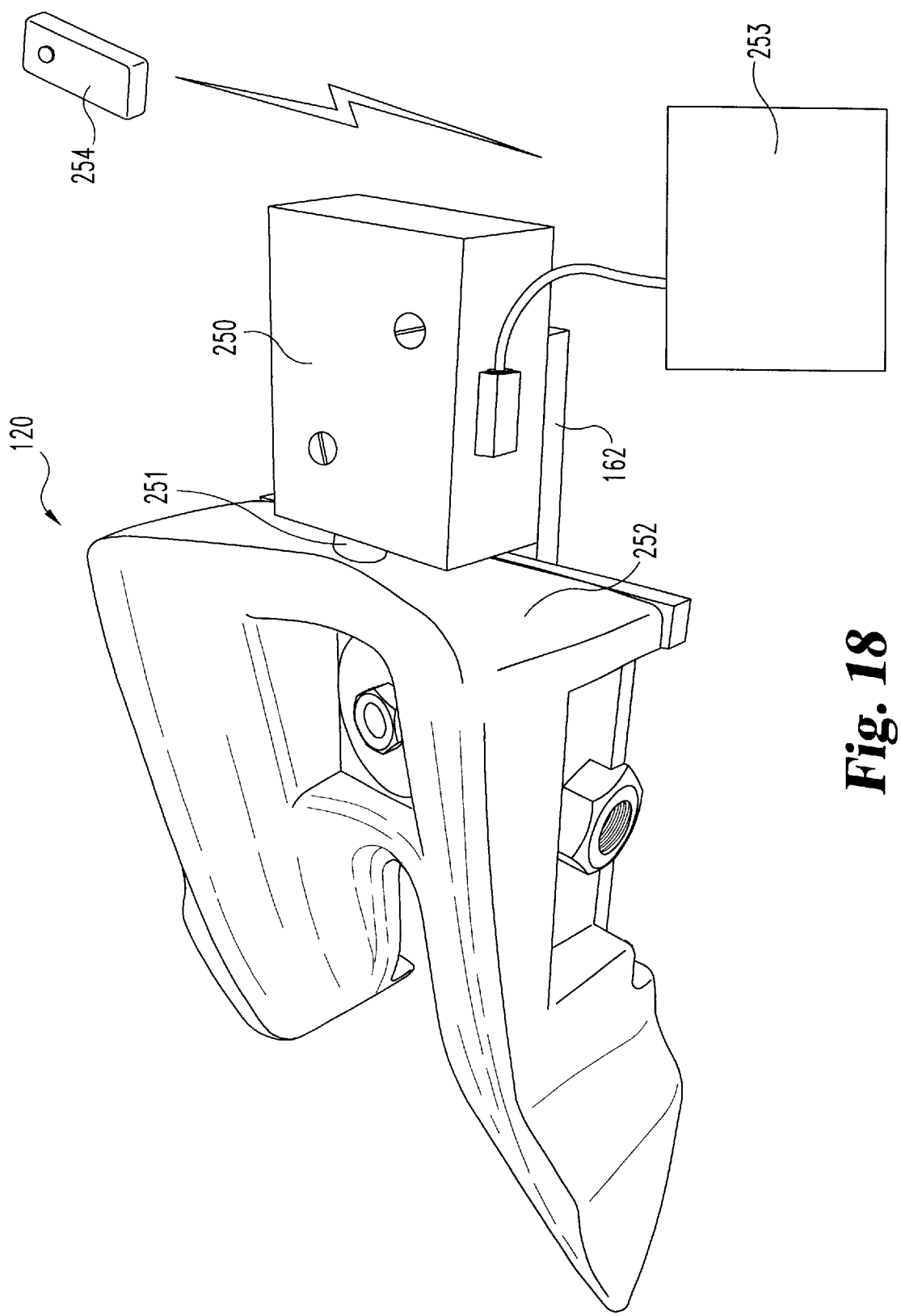
FIG. 18 is a diagrammatic illustration of the FIG. 8 latching mechanism with a remote control feature according to one embodiment of the present invention.

Since the present invention requires the movement of the release slide 162 in order to function, it is envisioned that a remotely-controlled solenoid can be used to effect the required movement of the release slide 162. With reference to FIG. 18, a diagrammatic representation of the envisioned arrangement is illustrated. To briefly recap, it is noted that to prepare the latching mechanism 120 for release of the U-bolt, the release slide 162, as configured in FIG. 10, needs to be pulled back a distance of approximately ½ inch. This changes the stowed and locked position of FIG. 10 to the launching position of FIG. 9. Before changing latching mechanism 120 from the stowed and lock position of FIG. 10 to the launching position of FIG. 9, the boat operator has started the boat motor. So, if the U-bolt is against the jaws, the boat can be moved forward on the trailer, freeing the jaws and allowing the boat to be launched under power and control.

The arrangement of FIG. 18 includes a solenoid module 250 which is anchored to the release slide 162 of latching mechanism 120. A plunger 251 extends outwardly from module 250 and is designed to contact rear surface 252 of the molded body 121. When it is desired to pull the release slide back, away from the U-bolt, the module is activated (i.e., energized), causing the plunger to move approximately ½ inch forward, thereby pushing against surface 252 and pulling the release slide back.

Power to module 250 is provided by vehicle power (12 volt battery) represented by module block 253, which is intended to represent a source of energizing power for the solenoid within module 250. If a remote control feature is desired, and preferably this would be the case, the receiver circuitry is packaged in module block 253 and is operated by hand-held transmitter 254.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A latching mechanism constructed and arranged to be attached to a boat trailer and to securely receive a boat bow connection member so as to facilitate keeping the boat on the boat trailer, said latching mechanism comprising:
   a main body; and
   a linkage subassembly attached to said main body, said linkage subassembly including:
      a frame member defining a receiving channel for receipt of said connection member, said receiving channel including an entrance;
      a pair of spring-biased latching members which are pivotally attached to said frame member, said spring-biased latching members being constructed and arranged to be normally oriented in a closed condition wherein said spring-biased latching members cooperate to narrow the width of said receiving channel at a location adjacent said entrance;

a release slide attached to said frame member and being moveable from a load-launch orientation to a stowed orientation, said release slide cooperating with said latching members so as to place said latching members in an openable condition, said release slide being spring-biased for the movement of said release slide from said load-launch orientation to said stowed orientation; and wherein said spring-biased latching members are pivotally moveable, when said release slide is in said load-launch orientation, to an open condition by the action of pushing said connection member into abutment against said spring-biased latching members until said connection member enters said receiving channel.

2. The latching mechanism of claim 1 wherein said main body is a unitary, molded member.

3. The latching mechanism of claim 1 wherein said main body is constructed and arranged with a pair of oppositely disposed protruding portions cooperating to help define a receiving slot.

4. The latching mechanism of claim 3 wherein said frame member includes a pair of oppositely disposed protruding portions cooperating to help define said frame entrance.

5. The latching mechanism of claim 4 wherein each protruding portion of the main body is constructed and arranged with an undercut relief area which captures one end of a corresponding one of the protruding portions of said frame member.

6. The latching mechanism of claim 5 wherein said main body and same frame are additionally secured to each other by a threaded fastener arrangement.

7. The latching mechanism of claim 1 wherein said main body includes a contoured upper surface which is constructed and arranged to receive the bow of a boat as it ramps up onto said latching mechanism.

8. The latching mechanism of claim 1 wherein said main body defines a receiving slot, said receiving slot and said receiving channel being aligned with each other and having a longitudinal mismatch so as to expose a portion of said main body within said receiving channel such that said exposed portion serves as an abutment surface.

9. The latching mechanism of claim 1 wherein said main body defines a pair of oppositely disposed relief areas, and wherein said boat trailer includes a winch support bracket, each relief being constructed and arranged to receive one side of said winch support bracket.

10. The latching mechanism of claim 1 wherein said release slide includes a jaw-facing portion constructed and arranged with a centered protruding tip, oppositely-disposed outward abutment portions, and a pair of latching member receiving recesses, there being one latching member receiving recess located between a first outward abutment portion and said protruding tip and there being another latching member receiving recess located between a second outward abutment portion and said protruding tip.

11. The latching mechanism of claim 1 wherein each latching member including an inwardly directed edge, the distance of separation between said edges changing as said latching members pivot.

12. The latching mechanism of claim 11 wherein each edge has a flat surface of a predetermined length selected based on the rate of travel of said connection member for a desired passage time.

13. The latching mechanism of claim 1 which further includes a remote-control receiver module attached to said latching mechanism and being operable to move said release slide in response to a signal from a remotely-located transmitter.

14. A latching mechanism constructed and arranged to be attached to a winch support bracket which is attached to a boat trailer and to securely receive a boat bow connection member so as to facilitate keeping the boat on the boat trailer, said latching mechanism comprising:

a main body; and a linkage subassembly attached to said main body, said linkage subassembly including:

a frame member defining a receiving channel for receipt of said connection member, said receiving channel including an entrance;

a first mounting connection on a first side of said frame member for attaching said latching mechanism to a first side of said winch support bracket;

a second mounting connection separated from said first mounting connection on a second side of said frame member for attaching said latching mechanism to a second side of said winch support bracket, said first and second mounting connections having a common axial centerline;

a pair of spring-biased latching members which are pivotally attached to said frame member, said spring-biased latching members being constructed and arranged to be normally oriented in a closed condition wherein said spring-biased latching members cooperate to narrow the width of said receiving channel at a location adjacent said entrance;

a release slide attached to said frame member and cooperating with said latching members so as to place said latching members in an openable condition; and wherein said spring-biased latching members are pivotally moveable to an open condition by the action of pushing said connection member into abutment against said spring-biased latching members until said connection member enters said receiving channel.

15. The latching mechanism of claim 14 wherein said axial centerline extends through said frame member.

16. The latching mechanism of claim 15 wherein said release slide is moveable from a load-launch orientation to a stowed orientation and said release slide being spring-biased for the movement of said release slide from said load-launch orientation to said stowed orientation.

17. The latching mechanism of claim 16 wherein each of said first and second mounting connections includes a threaded bolt-receiving member which is attached to said frame.

18. The latching mechanism of claim 17 wherein said frame member includes a first abutment edge which is constructed and arranged for abutment by a first arm of said winch support bracket and spaced therefrom a second abutment edge which is constructed and arranged for abutment by a second arm of said winch support bracket.

19. The latching mechanism of claim 14 wherein said release slide is moveable from a load-launch orientation to a stowed orientation and said release slide being spring-biased for the movement of said release slide from said load-launch orientation to said stowed orientation.

20. The latching mechanism of claim 14 wherein each of said first and second mounting connections includes a threaded bolt-receiving member which is attached to said frame.

21. The latching mechanism of claim 14 wherein said frame member includes a first abutment edge which is constructed and arranged for abutment by a first arm of said winch support bracket and spaced therefrom a second abutment edge which is constructed and arranged for abutment by a second arm of said winch support bracket.

22. The latching mechanism of claim 14 wherein said main body is a unitary, molded member.

23. The latching mechanism of claim 14 wherein said main body is constructed and arranged with a pair of oppositely disposed protruding portions cooperating to help define a receiving slot.

24. The latching mechanism of claim 23 wherein said frame member includes a pair of oppositely disposed protruding portions cooperating to help define said frame entrance.

25. The latching mechanism of claim 24 wherein each protruding portion of the main body is constructed and arranged with an undercut relief area which captures one end of a corresponding one of the protruding portions of said frame member.

26. The latching mechanism of claim 25 wherein said main body and same frame are additionally secured to each other by a threaded fastener arrangement.

27. The latching mechanism of claim 14 wherein said main body includes a contoured upper surface which is constructed and arranged to receive the bow of a boat as it ramps up onto said latching mechanism.

28. The latching mechanism of claim 14 wherein said main body defines a receiving slot and said frame member defines a clearance slot, said receiving slot and said clearance slot being aligned with each other and having a longitudinal mismatch so as to expose a portion of said main body within said clearance slot such that said exposed portion serves as an abutment surface.

29. The latching mechanism of claim 14 wherein said main body defines a pair of oppositely disposed relief areas, each relief area surrounding a corresponding one of said first and second mounting connections and being constructed and arranged to receive one side of said winch support bracket.

30. The latching mechanism of claim 14 wherein said release slide includes a jaw-facing portion constructed and arranged with a centered protruding tip, oppositely-disposed outward abutment portions, and a pair of latching member receiving recesses, there being one latching member receiving recess located between a first outward abutment portion and said protruding tip and there being another latching member receiving recess located between a second outward abutment portion and said protruding tip.

31. The latching mechanism of claim 14 wherein each latching member including an inwardly directed edge, the distance of separation between said edges changing as said latching members pivot.

32. The latching mechanism of claim 31 wherein each edge has a flat surface of a predetermined length selected based on the rate of travel of said connection member for a desired passage time.

33. The latching mechanism of claim 31 which further includes a pair of spaced-apart abutment posts constructed and arranged to limit the pivoting travel of said latching members.

34. The latching mechanism of claim 14 wherein said receiving channel having a closed end and said latching members being constructed and arranged to pivot in a direction away from said closed end whenever said boat is being launched from said boat trailer and whenever said boat is being loaded onto said boat trailer.

35. A latching mechanism constructed and arranged to be attached to a boat trailer and to securely receive a boat bow connection member so as to facilitate keeping the boat on the boat trailer, said latching mechanism comprising:

a main body that is constructed and arranged to provide a contact surface for guiding the bow of a boat as said connection member loads into said latching mechanism; and a linkage subassembly attached to said main body, said linkage subassembly including:

a frame member defining a receiving channel for receipt of said connection member, said receiving channel including an entrance;

a pair of spring-biased latching members which are pivotally attached to said frame member, said spring-biased latching members being constructed and arranged to be normally oriented in a closed condition wherein said spring-biased latching members cooperate to narrow the width of said receiving channel at a location adjacent said entrance;

a release slide attached to said frame member and being moveable from a load-launch orientation to a stowed orientation, said release slide cooperating with said latching members so as to place said latching members in an openable condition, said release slide being spring-biased for the movement of said release slide from said load-launch orientation to said stowed orientation; and wherein said spring-biased latching members are pivotally moveable, when said release slide is in said load-launch orientation, to an open condition by the action of pushing said connection member into abutment against said spring-biased latching members until said connection member enters said receiving channel.

36. The latching mechanism of claim 35 which further includes a remote-control receiver module attached to said latching mechanism and being operable to move said release slide in response to a signal from a remotely-located transmitter.

* * * * *